US007660207B1

(12) United States Patent
Treyz et al.

(10) Patent No.: US 7,660,207 B1
(45) Date of Patent: *Feb. 9, 2010

(54) DIGITAL AUDIO DEVICES

(76) Inventors: G. Victor Treyz, 250 Romain St., San Francisco, CA (US) 94131; Susan M. Treyz, 250 Romain St., San Francisco, CA (US) 94131

( * ) Notice: Subject to any disclaimer, the term of this patent is extended or adjusted under 35 U.S.C. 154(b) by 0 days.

This patent is subject to a terminal disclaimer.

(21) Appl. No.: 12/255,569

(22) Filed: Oct. 21, 2008

Related U.S. Application Data

(63) Continuation of application No. 11/960,578, filed on Dec. 19, 2007, now Pat. No. 7,460,440, which is a continuation of application No. 10/703,323, filed on Nov. 7, 2003, now Pat. No. 7,333,396, which is a continuation of application No. 09/528,814, filed on Mar. 20, 2000, now Pat. No. 6,678,215.

(60) Provisional application No. 60/173,247, filed on Dec. 28, 1999.

(51) Int. Cl.

| | |
|---|---|
| ***G04B 47/00*** | (2006.01) |
| ***G04B 47/02*** | (2006.01) |
| ***G04B 23/02*** | (2006.01) |
| ***H04B 1/00*** | (2006.01) |
| ***H04H 40/00*** | (2008.01) |

(52) U.S. Cl. ............................ 368/10; 368/12; 368/73; 379/110.01; 455/3.06

(58) Field of Classification Search ............. 368/10–13, 368/46, 47, 72–74, 250, 251; 340/624.69, 340/825.22; 379/93.5, 102.01, 102.03, 110.01; 455/3.01–3.03, 3.06, 130, 142, 151.2, 186.1, 455/188.2, 344, 352–355
See application file for complete search history.

(56) References Cited

U.S. PATENT DOCUMENTS

| | | | |
|---|---|---|---|
| 5,365,494 | A | 11/1994 | Lynch |
| 5,440,559 | A | 8/1995 | Gaskill |
| 5,572,442 | A | 11/1996 | Schulhof et al. |
| 5,600,711 | A | 2/1997 | Yuen |
| 5,677,895 | A | 10/1997 | Mankovitz |
| 5,805,530 | A | 9/1998 | Youngberg |
| 5,832,067 | A | 11/1998 | Herold |
| 5,835,665 | A | 11/1998 | Grossmeyer |
| 5,886,952 | A | 3/1999 | White |
| 5,905,865 | A | 5/1999 | Palmer et al. |
| 6,151,278 | A | 11/2000 | Najarian |
| 6,215,862 | B1 | 4/2001 | Lopes |
| 6,229,430 | B1 | 5/2001 | Smith Dewey |
| 6,256,378 | B1 | 7/2001 | Iggulden et al. |
| 6,483,782 | B1 | 11/2002 | Steinbach |
| 6,696,972 | B1 | 2/2004 | Bryans |
| 2002/0072326 | A1 | 6/2002 | Qureshey et al. |

*Primary Examiner*—Vit W Miska

(57) ABSTRACT

An alarm clock radio is provided that handles downloaded audio files and streaming digital audio files. The alarm clock radio may have buttons and displays that allow the user to adjust various alarm clock radio settings. The user may also adjust settings remotely over the Internet or over an in-home network. The user may customize the audio content that is provided with the alarm clock radio. Advertisements may be provided to the user. The user may be provided with an opportunity to subscribe to a content service. Content such as Internet radio station content, e-mail, news and other audio content may be provided to the user from the service. The user may set reminders for particular times and dates using the alarm clock radio. The alarm clock radio may also have a telephone handset. The alarm clock radio may have buttons and knobs and may provide on-screen options that allow the user to tune to AM and FM and Internet radio stations and to control the operation of the alarm clock radio.

16 Claims, 19 Drawing Sheets

DIGITAL AUDIO DEVICES

This application is a continuation of U.S. patent application Ser. No. 11/960,578, filed Dec. 19, 2007 now U.S. Pat. No. 7,460,440, which is a continuation of U.S. patent application Ser. No. 10/703,323, filed Nov. 7, 2003, now U.S. Pat. No. 7,333,396, which is a continuation of U.S. patent application Ser. No. 09/528,814, filed Mar. 20, 2000, now U.S. Pat. No. 6,678,215, which claims the benefit of U.S. provisional patent application No. 60/173,247, filed Dec. 28, 1999.

BACKGROUND OF THE INVENTION

This application relates to audio devices, and more particularly, to audio devices such as alarm clocks and radios.

Alarm clocks and clock radios are well known. Such devices allow users to set a wake-up time at which an alarm buzzer is triggered or the radio portion of the clock radio begins to play. However, the types of audio signals that are handled by such devices are limited.

It is therefore an object of the present invention to provide improved audio devices such as improved radios and improved clock radios.

It is another object of the present invention to provide audio devices that can handle audio signals other than traditional radio broadcasts.

SUMMARY OF THE INVENTION

These and other objects of the invention are accomplished in accordance with the principles of the present invention by providing audio devices that handle audio signals other than traditional radio broadcasts. The audio devices may, for example, be alarm clocks, clock radios, radios, or the like. Audio signals may be provided to the audio devices over a communications network from a potentially distant location. The audio devices may handle audio such as prerecorded music, news, e-mail that is played using a voice-synthesizer, e-mail with voice attachments or other audio attachments, voice mail from a telephone, Internet radio (i.e., radio that is "broadcast" on the Internet and that may be a rebroadcast of a conventional radio station signal from a potentially distant location), or any other suitable audio content.

The audio may be provided in the form of a downloaded digital file (e.g., files in the MP-3 format or any other suitable digital audio format). Such downloaded audio may be played when an alarm goes off to wake up the user of a clock. Because alarm clock radios are often used only briefly in the morning, alarm clock devices may only require a few minutes of play time from a downloaded file. If more play time is desired, more memory may be provided in the clock to accommodate larger downloads. Memory devices such as solid-state memory circuits, hard drives (e.g., miniature hard drives), or any other suitable storage arrangement may be used. An alarm clock radio may also automatically switch to an alternative audio source such as a live FM or AM broadcast if the stored audio runs out. If a downloaded file runs out during playback, the audio device may automatically switch to such a real-time audio source.

If desired, audio may also be provided in real time (e.g., from an Internet radio source or the like). Such streaming digital audio is essentially unlimited, and will not run out. Streaming audio that is received in real time may be buffered using local memory to improve its quality.

For clarity and brevity, the invention is often described in the context of a clock radio. However, the principles of the invention also apply to radios without clock radio functions, web appliances, and other such electronic audio devices.

The audio devices may receive digital audio using any suitable communications technology. As one example, a clock radio device may receive digital audio over telephone lines using modem circuitry. A clock radio of this type may include telephone capabilities if desired.

In general, the downloading of audio or the real time streaming of audio to an audio device requires that a communications path be established between the audio device and a desired audio source.

The audio device, the audio source, or other suitable equipment (e.g., a server on the Internet) may initiate the process of establishing the communications link. For example, if the audio device is a radio with a modem, the radio may automatically place a call to the audio source. If an audio file is being downloaded to an alarm clock device, this type of call may be placed early in the morning, well before the alarm is scheduled to go off. If audio is to be provided in real time, the alarm clock may establish the link just before wake-up time. The audio source may initiate the process of establishing the communications link by placing a call to the audio device at an appropriate time. In some arrangements (e.g., when the communications link is an Internet connection that is always on), the communications link may essentially have already been established.

Suitable communications technologies for providing audio to the audio device include technologies based on satellite systems, fiber optics, cable, wireless links, microwave links, free-space optical links, combinations of such technologies, etc. Communications between the audio device and the audio source may be unidirectional (from the audio source to the audio device) or may be bidirectional. Communications may involve digital or analog transitions. Signals may also involve paging or other messaging transmissions, e-mail transmissions, voice mail transmissions, cellular telephone transmissions, wireless Internet transmissions, packet-based transmissions, any other suitable type of data transmissions, or a combination of such transmissions.

The audio device may have appropriate communications hardware and software to support various communications functions. For example, the audio device may have FM and AM receivers, a receiver for a pager or other messaging service, a radio-frequency receiver, a modem, a telephone modem, a cellular modem, an integrated services digital network (ISDN) modem, a digital subscriber line (DSL) modem, a cable modem, or any other suitable communications circuitry. The audio device may be connected (wirelessly or with wire) to an in-home network that is connected to the Internet or other communications network by a computer or by a communications device. The choice of which of these arrangements to use may be based on economic and quality issues. For example, using higher bandwidth paths such as DSL paths may provide higher quality signals or faster download times, but may require more expensive hardware than using a lower bandwidth approach based, e.g., on a telephone line modem.

If the audio device is an alarm clock, the device may have a clock (time) set feature and an alarm set feature. The time may be set manually or may be set automatically by the clock. To automatically set the time, the clock may automatically call a predetermined number or otherwise establish a communications path that allows the clock to receive information on the current time. The alarm may be set to a desired wake-up time by the user.

The clock may have a snooze function that allows the user to press a dedicated button to postpone the wake-up alarm by a few minutes.

A band-select switch may be used to select between AM, FM, and Internet audio sources. The switch may be an analog mechanical switch or a digital switch.

E-mail messages may be sent to the audio device. The audio device (e.g., a clock) may have a unique e-mail address or may access the user's regular e-mail account. The audio device may retrieve e-mail by accessing a mail server to which the mail is directed. The mail server may be accessed at any convenient time, such as in the morning, just before an alarm awakens the user.

E-mail may be viewed on a display such as a liquid crystal display that is part of the audio device. If desired, voice synthesis circuitry may be used to vocalize the e-mail messages so that the user may listen to them. If an e-mail message has a voice attachment, the voice attachment may be played for the user. The audio device may have built-in telephone functions. If the telephone is not answered, the audio device may store messages like an answering machine. Voice mail messages may be handled by a server (e.g., a server in the telephone network or a server accessible through the Internet). This server may be accessed by the audio device when it is desired to retrieve and play the user's voice mail. Voice mail may also be stored on a local computer to which the audio device is connected over an in-home network.

Buttons may be provided on the audio device for playing, deleting, skipping, and reviewing messages, and performing any other suitable message management functions for e-mail and voice mail. If desired, a button or buttons on the audio device may be used to forward e-mail messages. Such buttons may be used when the user has more than one e-mail address. For example, the user may use one e-mail address for the audio device at home and another e-mail address for work. The user may press one or more of the buttons to forward all or some of the e-mail messages to the computer at work. If, for example, the user has just listened to or viewed an e-mail message using the audio device, the user may press a button that deletes that e-mail message from the audio device's e-mail list and forwards it to the user's work e-mail address. If desired, the audio device may be assigned the same e-mail address as the user's work address. Voice mail may also be forwarded using a dedicated button or buttons.

The user may opt to be awakened by music, news, e-mail, voice mail, a standard alarm buzzer, or any other suitable audio source or combination of sources.

The audio from these sources may be combined to form customized channels made up of portions of the various sources. For example, if the user enjoys country music, classical music, and sports news, these types of content may be combined (e.g., from Internet radio channels) into a custom channel. The user may schedule how portions or segments of the audio from various sources are to be played. For example, the user may select the content and the duration for desired audio segments. Customized content may be provided to the user by the audio device based on the user's interests.

The user may inform the audio device of the user's interests or the user may inform a service associated with the audio device (e.g., a service implemented on a server accessed over the Internet) of the user's interests. Information on the user's interests may also be collected automatically by monitoring the user's activities (e.g., by monitoring which stations the user listens to most often). If desired, the user's interests may be determined based on the user's interactions with web sites on the Internet that are not directly associated with the audio device (e.g., the user's interactions with a web site that sells compact disks or the like). Information on the user's interests may be provided to a service (e.g., an Internet-based service) that coordinates the delivery of customized audio content to the audio device for the user.

If the audio device is a clock, the audio device may have a calendar function. The user may record an audio reminder and assign a date to it. When the date arrives, the reminder may be played back. The user may also enter text for the calendar using an alphanumeric keypad, a touch screen, or any other suitable user interface. An alphanumeric keypad may also be used to help the user select Internet radio stations by their full name (e.g., BBC radio 5) or to provide the audio device with any suitable alphanumeric commands.

The audio device may have tuning controls that allow the user to tune to different audio content. For example, a manual tuning knob or digital tuning buttons may be used to tune to various AM, FM, and Internet stations. Analog or digital readouts may be used to display information on the current station to which the device is tuned.

An analog readout may use a needle or other suitable indicator to show which station the radio is currently tuned to. AM and FM stations may be labeled by their assigned transmission frequencies. Popular Internet radio stations may be assigned to the dial based on their transmission frequencies in their local market. In situations with duplications, duplicated frequencies may be located one after the other. In an audio device with a digital station display panel, an alphanumeric description of the station (e.g., BBC radio 5) may be displayed on the display panel. Information on the current band (AM, FM, or NET) may also be displayed.

With a digital tuning arrangement, up and down buttons may be used to allow the user to tune to different stations. Because the number of available Internet radio stations may be large (e.g., in the thousands), various layered menus may be used to assist the user in locating a station of interest. For example, menus may be presented on a display panel that allow the user to select Internet radio content based on geographic region, language of the content, or type of content (e.g., adult contemporary, alternative, blues, classical, news, sports, police radio, etc.) Internet radio stations may also be listed alphabetically or using any other suitable organization scheme. These organizational arrangements may be used to assist the user in locating audio content from a variety of sources, including AM, FM, short-wave radio (if the radio has short-wave capabilities), non-Internet digital radio services provided over a broadband communications network, Internet radio, downloaded audio files, etc.

Buttons may be provided on the audio device that allow the user to move a cursor through various menus and options that are displayed on the display panel and that allow the user to make desired selections. The buttons may include up and down and right and left arrow keys and a select or enter key. These buttons are merely illustrative. Any suitable buttons may be used if desired.

Dedicated buttons may also be provided to control clock set and alarm set functions, to control e-mail and voice-mail playback, to control the display of e-mail, to control clock set-up functions (e.g., relating to setting the date, the time zone, etc.), to control the snooze function, and to provide easy access to any other suitable functions. For example, buttons may be used to navigate between different audio segments during playback. Buttons may be used to select the types of music to be played. For example, one button may be used to play country music and another button may be used to play rock music. If a suitable display is used (e.g., a touch screen display with configurable on-screen labels), users may assign labels to certain buttons (e.g., a button may be labeled as the rock music button).

In order to maintain a small size for the audio device, the audio device may omit the display or may use a small display. It may therefore be desirable to provide an off-site service with which the user may interact to establish certain settings for the audio device. The settings may be downloaded to the audio device for use by the audio device or may be used by the service in determining which types of content to provide to the user and in determining what features to provide to the user.

For example, an off-site service may provide a web page that the user may interact with using a computing device such as a personal computer that is separate from the audio device (which may be, for example, a clock radio). If there are certain preferences or settings that the user wants to adjust (e.g., favorite Internet radio stations that the user wants the radio to tune to, certain wake-up sequences of music, e-mail, and the like, or certain other settings), the user may provide information on those preferences and settings using the web page.

As an example, an audio device may allow a user to set up 25 favorite stations. These stations may include, for example, Internet radio stations. Because hundreds or thousands of stations are available, a web page including information on various available stations may be used to help the user select the desired stations. The web page may be sponsored by a service associated with the audio device, may be a general directory, may be part of a radio station web site, or may be any other web page. The user may set up the stations for the clock radio that the user is interested in by clicking on links for stations that the user is interested in or by otherwise selecting the proper Internet addresses for the desired stations. Information on both non-Internet radio stations and Internet radio stations may be gathered using this type of remote interface.

Once information identifying the user's station preferences and the like has been gathered, this information may be used when providing audio content to the user at the audio device. For example, the preference information may be used to select which audio content is provided to the audio device (e.g., as downloaded files). If desired, the station preference information may be provided to the audio device and stored in memory. When the user presses up and down tuning buttons on the audio device, the device may tune to the next available station in the group of stations selected by the user. Dedicated buttons (e.g., number buttons) may each be assigned a different Internet radio station or other audio source if desired, to facilitate direct tuning. Internet radio stations and other audio sources may also be assigned to custom station names that are accessible through the display panel. A scan feature may be provided using a dedicated button or a menu option. If the user directs the audio device to scan, the device may tune to each of the available stations in the current band. If desired, scanning may be limited to a portion of a band or may be limited to the stations in the user's preferences.

Various audio device functions may be controlled using a remotely-accessed service such as a web-based service or the like. Functions that may be controlled in this way include setting the wake-up time for an alarm clock device, choosing a desired type of content (classical music, rock music, certain Internet radio stations, customized stations, e-mail, news, stock reports, weather reports, etc.) to play upon wake-up in an alarm clock and in what order and for what durations to play such content, choosing clock settings, such as time zone, daylight savings time, etc. These settings and preferences may be used in providing services to the audio device (e.g., when downloading content in advance or providing content in real time) or may be provided to the device and stored for local use by the device. If desired, web page interfaces or the like may be used to control or establish settings for the audio device or other such devices over a local communications link (e.g., an intranet link or an in-home network).

A remote service for adjusting settings and preferences may be based on an Internet interface and accessed by the user with a separate web browser, may be based on an Internet interface and accessed with a web browser that is part of the alarm clock hardware, may be based on an automatic interactive telephone system that plays audio prompts for the user and responds when the user presses certain touch-tone key on the telephone keypad, may be based on an operator-manned customer service facility in which an operator enters settings into a computer after talking to the customer or receiving an e-mail from the customer, or any other suitable scheme in which settings and preferences and the like are adjusted using equipment that is remote from the audio device. Settings and preferences may also be adjusted using dedicated buttons on the device or using menu options or the like that are provided locally by the device when the device has a suitable display screen.

Audio clip descriptions may be provided for each radio station. When the user selects a suitable option, the audio device may play the audio clip description. This allows the user to evaluate whether to add a station (e.g., an Internet radio station) to the tuning sequence of the audio device, without requiring a large display panel on the audio device to display text descriptions of the channel.

Audio service may be provided to the user at the audio device with or without advertisements. This may affect the cost of the service to the user. For example, an Internet radio station or news service or other audio service without commercials may charge a subscription fee, whereas services with advertisements may be received for free.

Advertisements may be targeted to the user based on the user's preferences. Information on the user's preferences that is used in targeting advertisements may be gathered by monitoring the user's activities at the audio device and reporting those activities to an appropriate service (e.g., a service located on a remote server on the Internet or the like). Information on the user's preferences may also be gathered based on the preferences and settings that the user uses to set up operation of the audio device and that the user uses to customize the content that the user listens to. Advertisements may be provided in real time as streaming digital audio or may be downloaded as digital files and played back at a later time.

If the audio device is a clock radio, the device preferably has clock circuitry and a display (analog or digital) that shows the current time. The time may be set automatically by the device. For example, the device may contact an Internet service to check the current time or may be provided with data on the current time. Multiple users may set different alarm times and profiles using the same clock. For example, one user may establish an early wake-up time and a profile reflecting an interest in rock music, while another user may establish a later wake-up time and a profile reflecting an interest in classical music.

An auxiliary audio output (e.g., a stereo output) may be used to connect the audio device to an audio receiver. If desired, the radio functions of the audio device may be provided in a stand-alone radio or other such appliance.

Voice recognition technology may be used for controlling the audio device. For example, voice recognition may be used to allow a user to direct the device to forward e-mail messages or voice mail messages, to navigate through audio segments or to select a desired type of music to play, to direct an alarm clock to switch from playing an alarm buzzer to playing music, or to perform any other suitable functions.

The audio devices may be located in the home or in any other suitable location. Audio devices may be mobile devices (e.g., car radios). A suitable communications link for such a mobile audio device may be based, for example, on cellular modem technology or other suitable wireless technology.

The user may be provided with the ability to block objectionable audio content. Content may be blocked based on ratings information that is associated with the audio content. Such ratings information may be provided by the audio source that supplies the audio content or a third party service that collects or creates the ratings information. Content may be blocked locally (e.g., at the audio device) or may be blocked remotely (e.g., at an audio service such as a centralized Internet service that serves to collect and distribute audio content to the audio device).

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
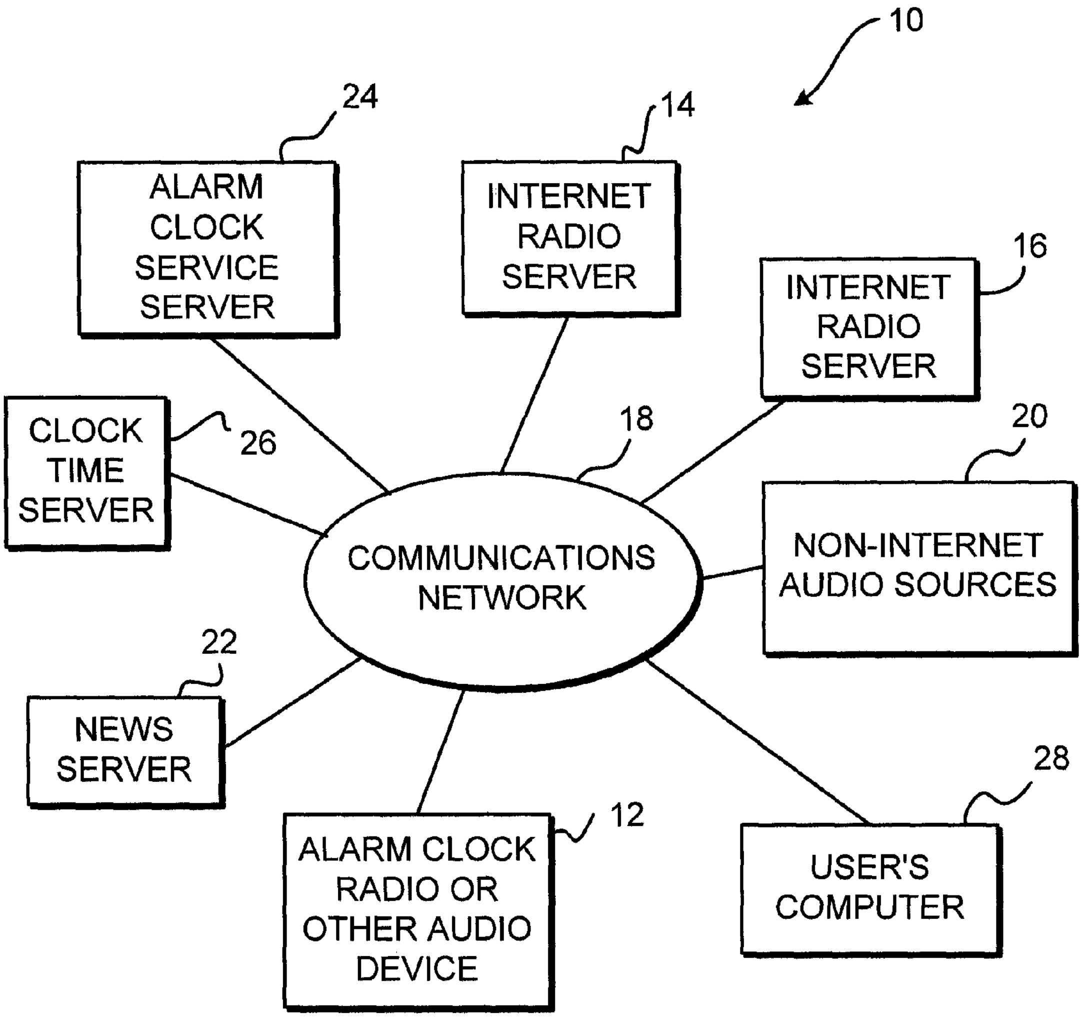
FIG. 1 is a schematic diagram of an illustrative system in accordance with the present invention.

An audio device system 10 in accordance with the present invention is shown in FIG. 1. An alarm clock radio or other audio device 12 handles audio signals other than traditional radio broadcasts. Audio device 12 may be, for example, an alarm clock, an alarm clock radio, a radio, or the like. For clarity, the invention will sometimes be discussed in connection with alarm clock radios. If desired, however, the features of the invention may also be applied to audio devices other than clock radios such as stereos, portable digital audio players, automobile personal computers, web appliances, personal computers with audio cards and speakers, etc. Such audio devices may have displays.

Audio signals for alarm clock radio 12 may be provided over a communications network 18 from a potentially distant location. Communications network 18 may be any suitable communications network, such as a network based on the Internet, the public switched telephone network, or any other suitable communications network.

Alarm clock radio 12 may handle audio such as prerecorded music, news, e-mail that is played using a voice-synthesizer in alarm clock radio 12, e-mail with voice attachments or other audio attachments, voice mail from a telephone, Internet radio (i.e., radio that is "broadcast" on the Internet and that may be a rebroadcast of a conventional radio station signal from a potentially distant location), or any other suitable audio content. Internet radio content may be received by alarm clock radio 12 over communications network 18 from Internet radio servers such as Internet radio servers 14 and 16. Such servers may receive radio content from radio stations over a broadcast link, a satellite link, a fiber-optic or cable link, a combination of such links, or any other suitable communications path. If desired, the radio stations may provide the radio content to servers 14 and 16 using communications network 18.

News information and the like may be received from news servers such as news server 22. This information and information from other sources may be in the form of text, audio, and video. The information may be presented to the user at the alarm clock radio 12 in the form of audio through a speaker on alarm clock radio 12. Text and the audio portion of video signals may also be presented in the form of audio. If desired, text may be converted to audio using voice synthesizing arrangements. If alarm clock radio 12 has a display, text, graphics, and video may be displayed on the display. Less expensive alarm clock radios may be configured to only handle text and not video.

Audio content may be provided to alarm clock radio 12 from non-Internet audio sources such as non-Internet audio sources 20 over communications network 18. Such sources may, for example, be digital radio stations offered on a subscription basis, rather than broadcast radio sources that have been streamed over the Internet.

If desired, the user may subscribe to an audio service offered through a service provider such as a service provider associated with alarm clock service server 24. The alarm clock service server 24 may provide customized audio, news, and any other suitable content for the alarm clock radio 12 over communications network 18.

Audio may be provided in the form of downloaded digital files (e.g., files in the MP-3 format or any other suitable digital audio format) or in the form of streaming digital audio. Such downloaded or streaming audio may be played when an alarm goes off to wake up the user of alarm clock radio 12. Because alarm clock radios are often used only briefly in the morning, alarm clock radio 12 may only require a few minutes of play time from a downloaded file. If more play time is desired, more memory may be provided in the clock to accommodate larger downloads or streaming content or AM or FM broadcasts or other audio sources may be used. If desired, audio may be provided from a compact disc player integrated into alarm clock radio 12 or audio may be provided as a digital or analog feed over a broadband network (e.g., a communications network).

Alarm clock radio 12 may have a clock (time) set feature and an alarm set feature. The time may be set manually or may be set automatically by the clock. To automatically set the time, the clock may automatically call a predetermined number or otherwise establish a communications path over communications network 18 with a server such as clock time server 26 that allows the clock to receive information on the current time. The alarm may be set to a desired wake-up time (alarm time) by the user.

Alarm clock radio 12 may receive digital audio using any suitable communications technology. As one example, alarm clock radio 12 may receive digital audio over telephone lines using modem circuitry. If desired, alarm clock radio 12 or other such device may be connected to the communications network 18 through an in-home network.

Figure 2:
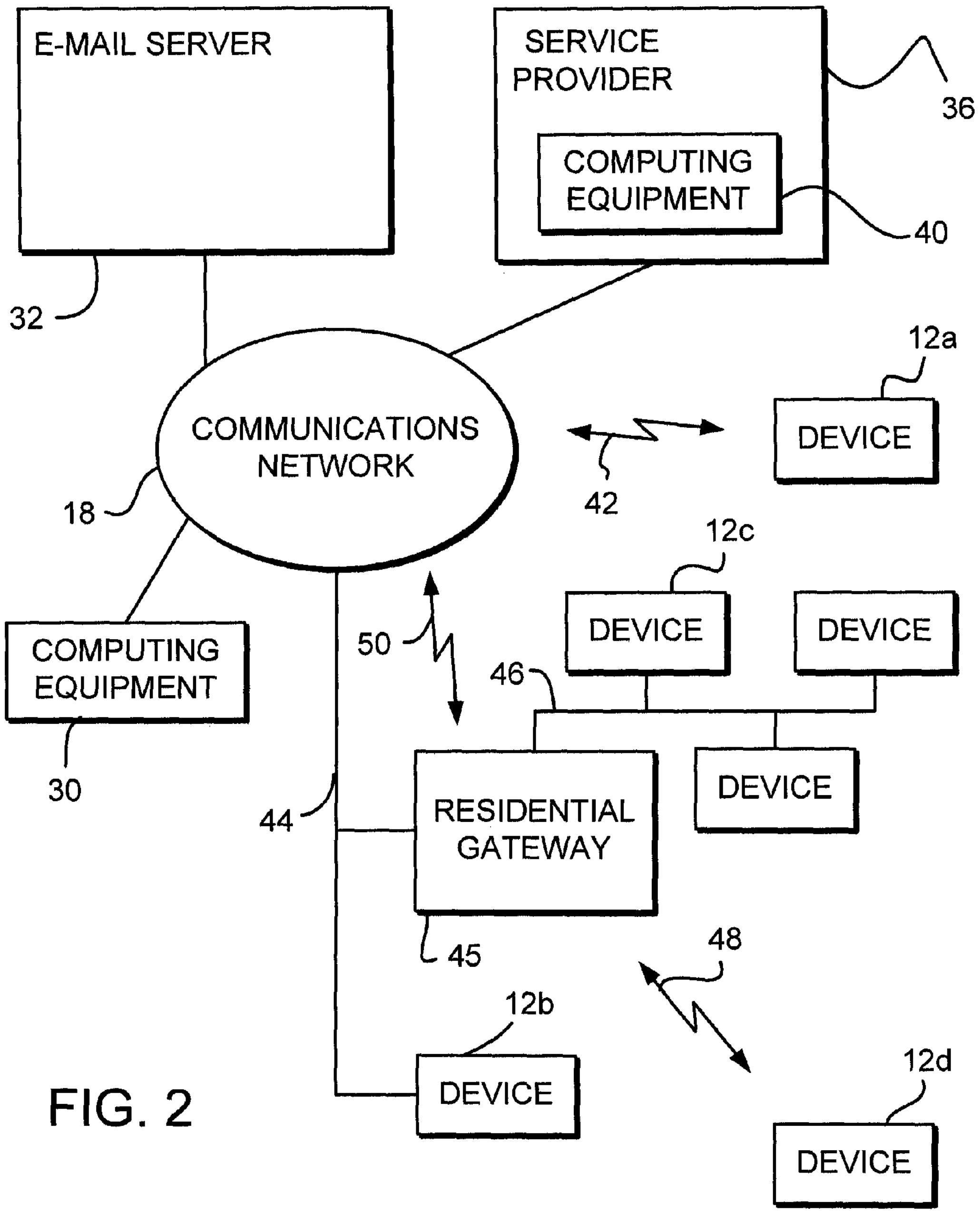
FIG. 2 is a schematic diagram of an illustrative system showing details of an in-home network arrangement in accordance with the present invention.

Various arrangements for connecting alarm clock radio 12 or other such devices to communications network 18 are shown in FIG. 2. In FIG. 2, alarm clock radio 12 is represented by device 12*a*, device 12*b*, device 12*c*, and device 12*d*. Devices 12 may communicate with communications network 18 directly or through intermediate equipment using various different communications paths or links. For example, devices such as devices 12*a* and 12*b* may communicate with communications network 18 directly over communications paths 42 and 44. Devices such as devices 12*c* and 12*d* may communicate with communications network 18 through residential gateway 45 over communications paths such as paths 46 and 48. Residential gateway 45 may communicate with communications network 18 using communications paths such as communications path 44 or communications path 50.

Communications paths such as paths 42, 48, and 50 may be wireless communications paths. Any suitable wireless communications arrangement may be used for such paths. For example, these wireless communications paths may use infrared (IR) transmissions, radio-frequency (RF) transmissions, paging or other messaging transmissions, terrestrial RF transmissions (e.g., to a terrestrial base station such as a cellular base station for a cellular telephone network or the like or other suitable terrestrial network equipment), satellite transmissions (e.g., bidirectional satellite transmissions or satellite transmissions used in combination with a wired return path), local wireless network transmissions, wide area network transmissions, HomeRF transmissions, Bluetooth transmissions, or any other suitable wireless transmissions or combination of such transmissions. In some arrangements, certain types of transmissions may be more suitable than others. For example, for paths such as paths 42 and 50, which link device 12*a* and residential gateway 45 directly with communications network 18, it may be more appropriate to use long-range wireless links such as paging links, long-range terrestrial links such as cellular telephone links, or satellite links. For paths such as path 48, which may be entirely within the home, IR transmissions or relatively short-range wireless links such as HomeRF or Bluetooth links or other links suitable for wireless local area networks may be used.

Paths such as paths 44 and 46 may be wired paths. For example, paths 44 and 46 may use twisted pair paths, telephone wire paths, power line paths (e.g., using the existing power wires and outlets in a home), coaxial cable paths, buses, universal serial bus (USB) cables, FireWire (IEEE 1492) cables, fiber-optic paths, or any other suitable paths or combinations of such paths.

These examples are merely illustrative. Any other suitable wired or wireless paths may be used to connect the alarm clock radio or other device 12 to communications network 18. Moreover, a combination of wired and wireless paths may be used for these links if desired.

Residential gateway 45 may be any suitable equipment suitable for performing gateway functions, such as a personal computer or other computer equipment, a home security system controller, a home automation controller, computing equipment that acts as a server for in-home client devices, a set-top box, a game system console, or any other suitable computing and communications equipment. Residential gateway 45 may include communications circuitry such as a cable modem, ISDN modem, DSL modem, telephone modem, or other such equipment to communicate with communications network 18.

Residential gateway 45 may be a computer that acts as a server processor for multiple in-home client devices including device 12*c*. The in-home client devices may perform alarm clock radio or other audio device functions. Such in-home client devices may also use sensors to provide information to the server, may be control devices for controlling various in-home equipment, may be information display terminals for displaying information from the server, or input terminals that the user may use to provide instructions to the server. If desired, the devices connected to residential gateway 45 may perform combinations of such functions. For example, device 12*c* may perform alarm clock radio functions and another device connected to residential gateway 45 may perform sensor functions and information retrieval and input functions. Another device connected to residential gateway 45 may act only as a sensor and another device may act only as an information display device.

Devices such as device 12*d* may be networked with devices such as devices 12*c* or equivalent wireless devices or may operate independently from such devices. In-home wireless networks may use wireless protocols such as HomeRF or Bluetooth, or any other suitable wireless protocol. In a home with wireless communications capabilities, device 12*d* may be, for example, an alarm clock radio in the user's bedroom that communicates with residential gateway 45 in a home office over a Bluetooth or HomeRF link or other suitable local wireless link. The residential gateway 45 may communicate with communications network 18 over, for example, a wired link 44 such as a cable modem or DSL link. Because device 12*d* is wireless, it is relatively easy to place device 12*d* in a convenient location within the home. Because communications paths such as cable modem and DSL line connections may be always on, it may be easy for residential gateway 45 to periodically obtain audio content for device 12*b* over the Internet. Placing orders for products over the Internet may also be relatively easy, because the overhead associated with establishing a telephone dial-up connection may be avoided. Arrangements in which telephone-based modems or the like are used may be advantageous in situations in which cable modem or DSL modem service is not available or economical.

These additional illustrative examples are not exhaustive, but represent a few possible configurations for using the alarm clock radio or other such device 12 to communicate with communications network 18.

Alarm clock radio 12 may receive e-mail from computing equipment such as e-mail server 32 over communications network 18. E-mail may be provided on request or at predetermined intervals or the like. E-mail for alarm clock radio 12 may be sent from any suitable computer connected to communications network 18.

A service provider 36 may use computing equipment 40 to provide audio content and other services to alarm clock radio 12 over communications network 18. Service provider 36 may be associated with the manufacturer of alarm clock radio 12, may be associated with an Internet portal, may be associated with a subscription service (e.g., an audio subscription service or a custom audio content service), or may be associated with any other suitable entity.

Alarm clock radio 12 may also communicate with other suitable computing equipment 30 over communications network 18. Computing equipment such as computing equipment 30 may be used to provide services such as those proved by the servers and sources of FIG. 1 or the like. Computing equipment 30 may also belong to an individual or an on-line merchant or the like.

Alarm clock radio 12 may have various user-adjustable settings. For example, the user may adjust the wake-up time for the alarm or may manually adjust the time of the clock. Various buttons may be used to adjust such settings.

Alarm clock radio 12 may also provide functions that involve more complex settings. For example, functions may be provided that allow the user to select which Internet radio stations or other real-time Internet sources are to be streamed to alarm clock radio 12 or which MP3 files are to be downloaded to alarm clock radio 12. The user may also be allowed to adjust settings related to communications configuration options such as e-mail configuration options or the like.

If desired, the user may adjust settings using an external device that is in communication with alarm clock radio 12 over a wired or wireless link. This type of arrangement may allow the user to select from numerous options or to enter text more easily than might be possible using a relatively small number of buttons on alarm clock radio 12. An external device may also be used to adjust alarm clock radio settings from a location that is remote from alarm clock radio 12 (e.g., from another room of the user's home or the user's office, etc.).

If the user is located at a remote location such as the user's office, a computer such as user's computer 28 of FIG. 1 may be used to adjust the settings of alarm clock radio 12 over communications network 18. Alarm clock radio 12 may be connected to communications network 18 using the arrangements of FIG. 2.

Figure 3:
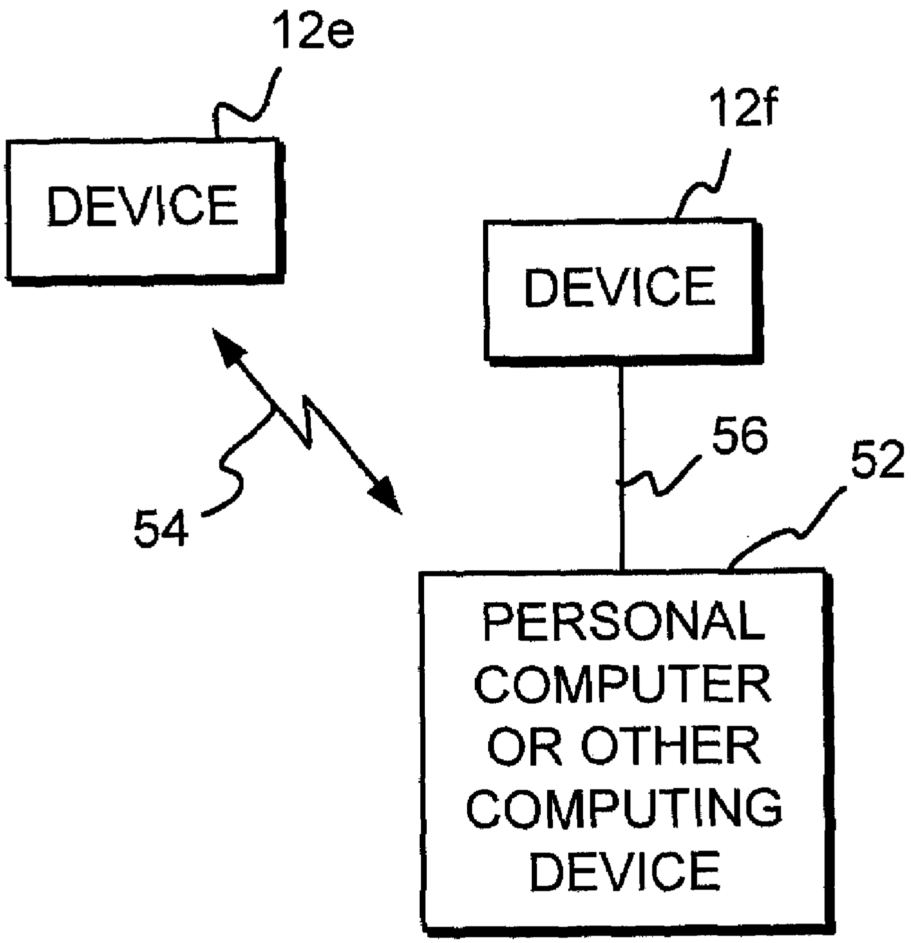
FIG. 3 is a schematic diagram illustrating how audio devices may communicate with personal computers and other such devices over wireless links in accordance with the present invention.

If the user is located in the home, for example, an arrangement such as the arrangement of FIG. 3 may be used. As shown in FIG. 3, the user may use a personal computer or other computing device 52 to communicate with an alarm clock radio or other device 12*e* over wireless link 54. Device 52 may be, for example, a handheld computing device such as a palm-sized computing device or the like. Wireless link 54 may use infrared (IR) transmissions, radio-frequency (RF) transmissions, paging or other messaging transmissions, terrestrial RF transmissions (e.g., through a terrestrial base station such as a cellular base station for a cellular telephone network or the like or other suitable terrestrial network equipment), satellite transmissions (e.g., bidirectional satellite transmissions or satellite transmissions used in combination with wired paths), local wireless network transmissions, wide area network transmissions, HomeRF transmissions, Bluetooth transmissions, or any other suitable wireless transmissions or combination of such transmissions. As an example, device 52 may be a handheld computer with local wireless capabilities such as IR or RF (e.g., HomeRF or Bluetooth) capabilities.

The user may also use a personal computer or other computing device 52 to communicate with an alarm clock radio or other device 12*f* over wired link 56. If desired, wireless and wired links may be made between the personal computer or other computing device 52 and devices such as devices 12*e* and 12*f* over in-home network paths such as the communications paths to and from devices 12*a*, 12*b*, 12*c*, and 12*d* and residential gateway 45 of FIG. 2. As an example, device 52 of FIG. 3 may communicate with device 12*e* and 12*f* over a path that involves a wired or local wireless IR or RF link from a handheld computer or personal computer in the home to residential gateway 45 and a wired or local IR or RF link from residential gateway 45 to device 12*e* or 12*f*.

Figure 4:
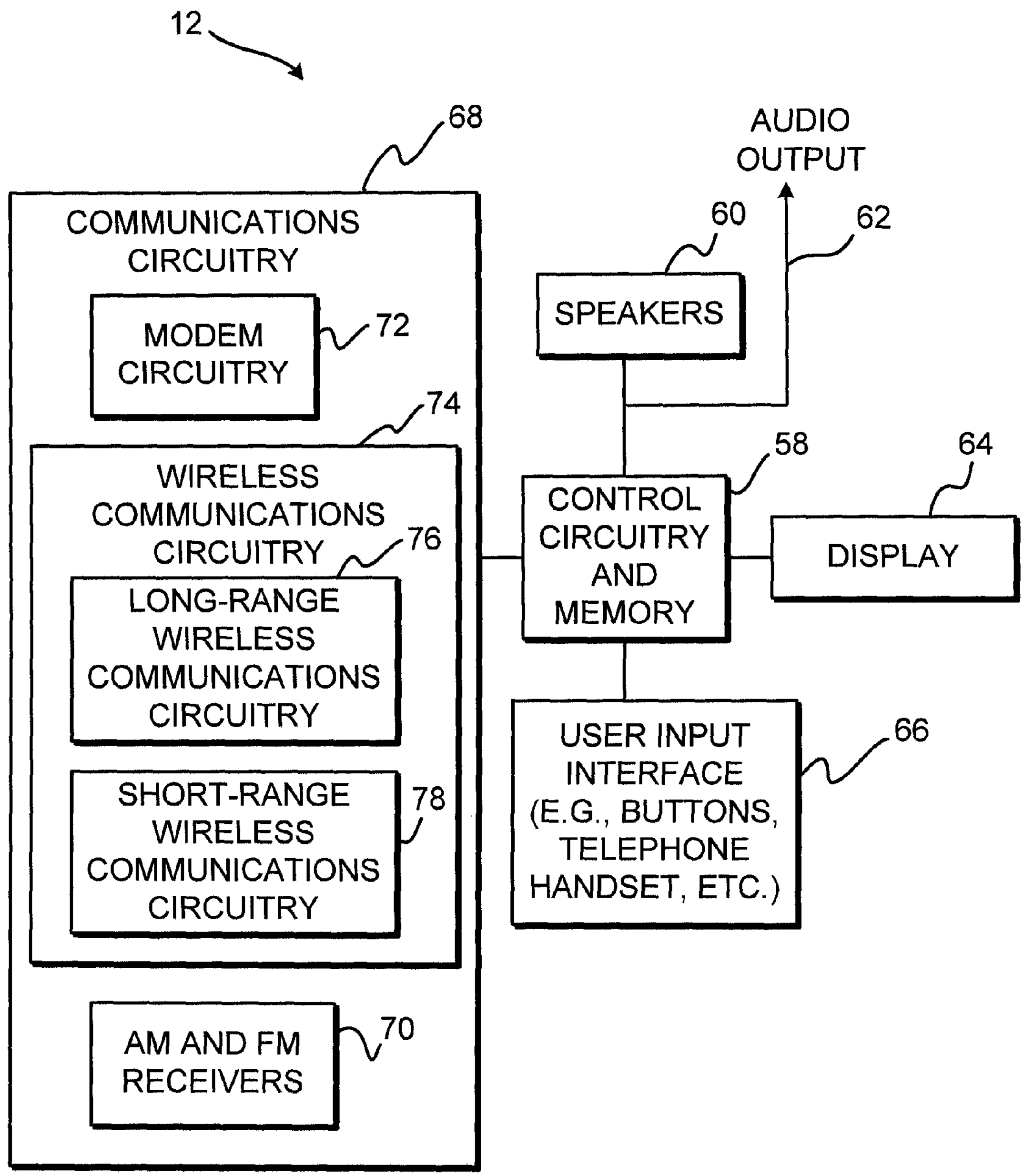
FIG. 4 is a schematic diagram of an illustrative audio device in accordance with the present invention.

A diagram of an illustrative alarm clock radio or other audio device 12 is shown in FIG. 4. Control circuitry and memory 58 may be used to control the operation of alarm clock radio 12. Control circuitry and memory 58 may be based on a microprocessor or microcontroller and may include digital signal processing circuitry and application specific integrated circuits or any other suitable control and processing circuitry. Memory devices such as solid-state memory circuits, hard drives (e.g., miniature hard drives), or any other suitable storage arrangement may be used.

Speakers 60 may be used to play audio for the user. An audio output 62 may be used to pass analog or digital audio signals to auxiliary sound equipment (e.g., a stereo system, personal computer, etc.).

A display 64 may be used to display e-mail, news, and other information and content for the user. Display 64 may also be used to provide the user with on-screen options for controlling alarm clock radio 12. For example, display 64 may be used to display on-screen options related to adjusting various configuration settings for alarm clock radio 12.

A user interface 66 may be used to allow the user to interact with alarm clock radio 12. User interface 66 may involve the use of buttons or keys. The buttons or keys may be dedicated to particular functions. For example, a dedicated button may be provided that the user may press to order products that are offered using streaming audio or MP3 audio downloads. When the order button is pressed, alarm clock radio 12 may send the order to an appropriate service such as a service associated with computing equipment 30 of FIG. 2 over communications network 18.

User interface 66 may also allow the user to supply audio inputs to alarm clock radio 12. For example, user interface 66 may include a microphone or a telephone handset. Alarm clock radio 12 may support voice recognition, so that the user may issue audible commands to alarm clock radio 12.

If desired, user interface 66 may include a pointing device such as a touch pad or track ball. A touch screen or other touch-sensitive input device may be used. A touch-sensitive input device may support handwriting recognition.

One or some or all of these user input interface arrangements may be used in any suitable combination. User input interface 66 may be built into alarm clock radio 66, may be provided using peripheral components, or may use both integral and peripheral components.

These are merely illustrative examples. Any suitable user input interfaces may be used to supply input to alarm clock radio 12.

Alarm clock radio 12 may have communications circuitry 68 for supporting various communications functions. For example, AM and FM receivers may be used to receive radio broadcasts or data. Modem circuitry 72 such as a telephone modem, an integrated services digital network (ISDN) modem, a digital subscriber line (DSL) modem, a cable modem, or any other suitable communications circuitry may be used to support communications with other devices over communications network 18, an in-home network, a direct wired connection, etc. Modem circuitry 72 or other circuitry in communications circuitry 68 may be used to support communications over wired connections such as universal serial bus connections, IEEE 1394 (FireWire) connections, parallel or serial bus connections, or any other suitable wired connections.

If desired, communications circuitry 68 may include wireless communications circuitry 74. Wireless communications circuitry 74 may include long-range wireless communications circuitry 76 such as a receiver for a pager or other messaging service, a cellular modem or other transmitter/receiver for terrestrial communications (e.g., communications with a cellular telephone system or other terrestrial wireless network), a satellite transmitter/receiver, etc. Wireless communications circuitry 74 may also include short-range wireless communications circuitry 78. Short-range wireless communications circuitry 78 may be, for example, HomeRF or Bluetooth or other short-range wireless RF circuitry, IR circuitry, or any other circuitry suitable for supporting short-range wireless communications.

Alarm clock radio 12 may automatically switch to an alternative audio source such as a live FM or AM broadcast received by AM and FM receivers 70 if downloaded audio runs out. Audio that is provided in real time such as audio from an Internet radio source such as one of Internet radio servers 14 or 16 is essentially unlimited and will not run out, but may be buffered using the memory of control circuitry and memory 58 to improve its quality.

Figure 5:
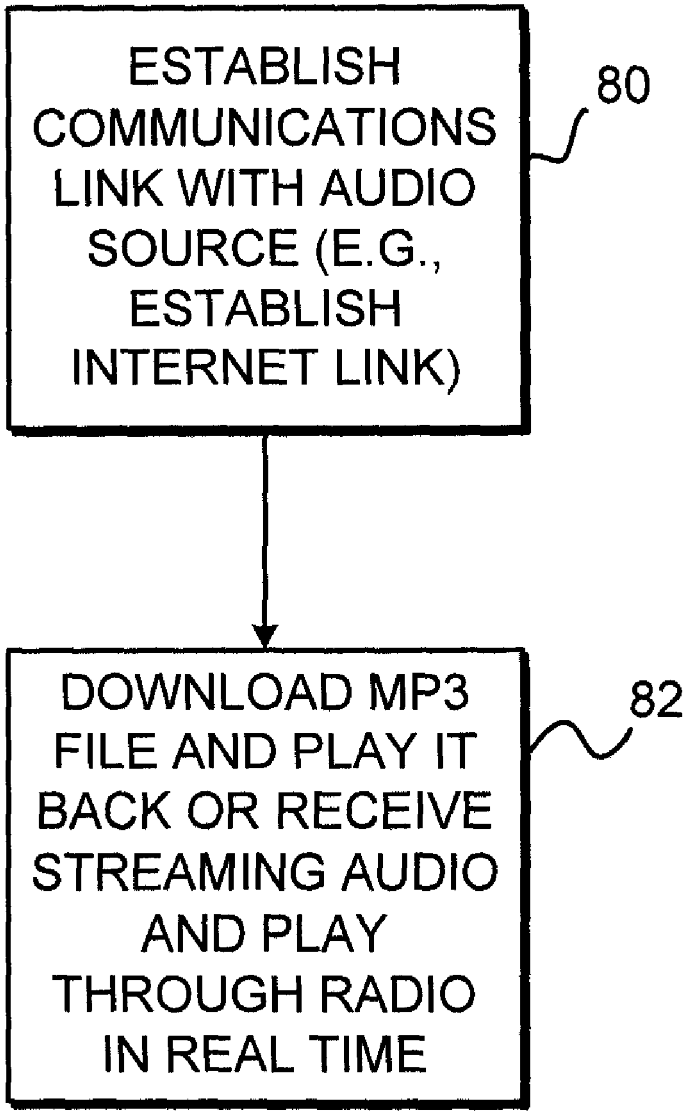
FIG. 5 is a flow chart of illustrative steps involved in establishing a communications link and providing audio content over the link in accordance with the present invention.

Illustrative steps involved in providing audio content to the user with alarm clock radio 12 are shown in FIG. 5. The downloading of audio or the real time streaming of audio to alarm clock radio 12 requires that a communications path be established between the alarm clock radio 12 and a desired audio source (e.g., one of the audio sources of FIG. 1). At step 80, a communications link may be established with an appropriate audio source. Alarm clock radio 12, the audio source, or other suitable equipment (e.g., a server on the Internet associated with the audio source) may initiate the process of establishing the communications link at step 80. For example, alarm clock radio 12 may automatically place a call to the audio source over a telephone line or may initiate communications over a cable modem or DSL modem Internet link. If an audio file (e.g., an MP3 file) is to be downloaded to alarm clock radio 12, this type of call may be placed early in the morning, well before the alarm is scheduled to go off. If audio is to be provided in real time (e.g., as streaming Internet content), the alarm clock may establish the link just before wake-up time. The audio source may initiate the process of establishing the communications link by placing a call to alarm clock radio 12 at an appropriate time (e.g., in sufficient time before wake-up time if the audio is to be provided as a download or just before wake-up time if the audio is to be streamed to alarm clock radio 12 in real time).

At step 82, the audio may be provided to alarm clock radio 12 and played back for the user. The audio may be provided as a downloaded file (e.g., an MP3 file) and played back with an appropriate digital audio player (e.g., an MP3 player) implemented using control circuitry and memory 58. The audio may also be streamed to alarm clock radio 12 in real time and played back to the user using a streaming audio player (e.g., using a streaming media player from Microsoft or Real Networks or the like). The audio may be played back to the user at the wake-up time to which the user set alarm clock radio 12, may be played back to the user when the user turns on the radio, or may be played back to the user at any other suitable time.

Suitable communications technologies for providing audio to alarm clock radio 12 include technologies based on satellite systems, fiber optics, cable, wireless links, microwave links, free-space optical links, etc. Communications between the audio device and the audio source may be unidirectional (from the audio source to the audio device) or may be bidirectional. Communications may involve digital or analog transitions. Signals may also involve paging or other messaging transmissions, e-mail transmissions, voice mail transmissions, cellular telephone transmissions, wireless Internet transmissions, packet-based transmissions, any other suitable type of data transmissions, or a combination of such transmissions.

Figure 6:
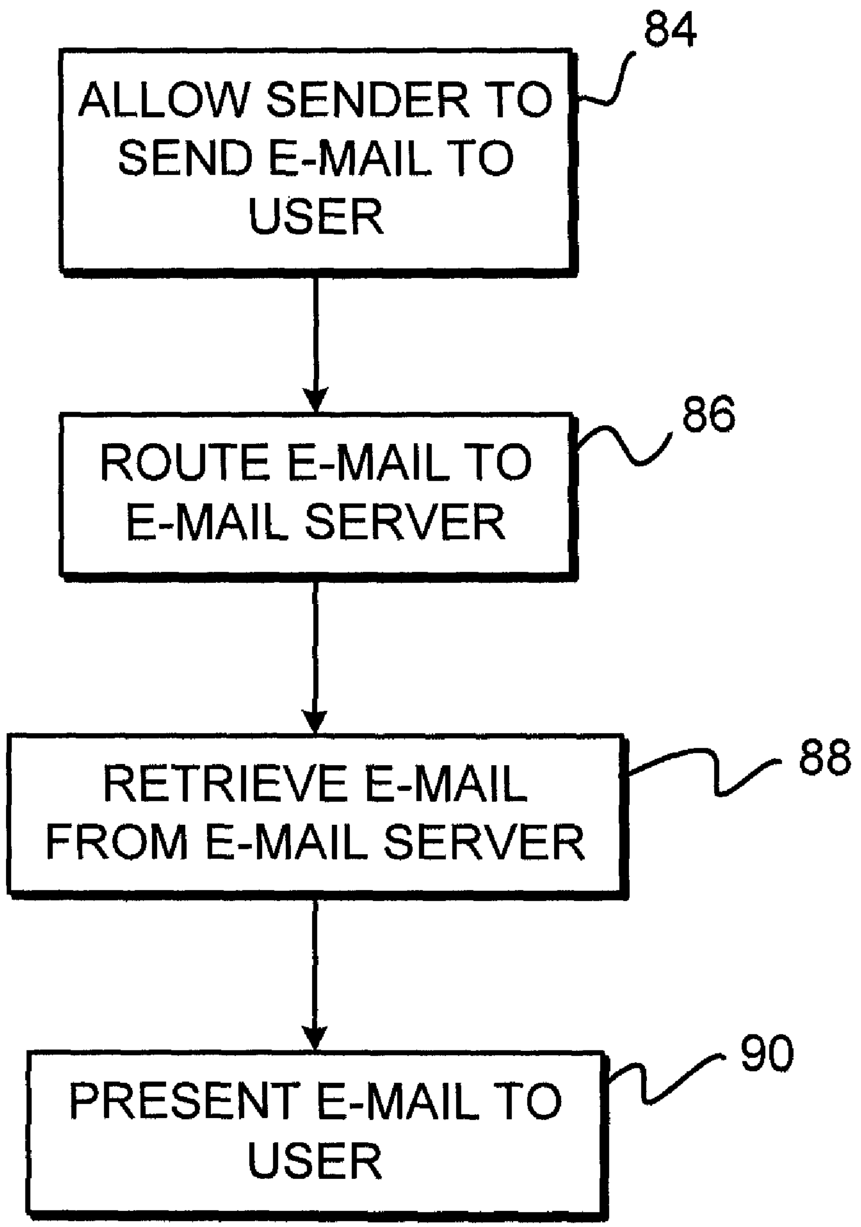
FIG. 6 is a flow chart of illustrative steps involved in using the audio device to handle e-mail in accordance with the present invention.

If desired, e-mail messages may be sent to alarm clock radio 12. Illustrative steps involved in sending e-mail to alarm clock radio 12 are shown in FIG. 6. Alarm clock radio 12 may have a unique e-mail address or may access the user's regular e-mail account. At step 84, a sender may be provided with an opportunity to send e-mail to the user. The user may, for example, use an e-mail application implemented on a personal computer connected to communications network 18 of FIG. 2 to send an e-mail message to the user. At step 86, routers or other equipment in network 18 may route the e-mail message to the user's e-mail server (e.g., e-mail server 32 of FIG. 2). At step 88, alarm clock radio 12 may retrieve the e-mail message from the e-mail server. Alarm clock radio 12 may be configured (by default or by the user) to retrieve e-mail messages at predefined intervals or when requested by the user. At step 90, alarm clock radio 12 may present the e-mail to the user. E-mail may be presented to the user on a display such as display 64 of FIG. 4. If desired, e-mail may also be played back for the user through speakers 60 of alarm clock radio 12 using voice-synthesis. E-mail with audio attachments may also be played back through speakers 60. Speakers 60 may also be used to play back voice mail for the user such as voice mail stored by an alarm clock radio 12 with telephone answering machine capabilities or voice mail forwarded from another location to alarm clock radio 12.

These steps are merely illustrative. Any other suitable techniques may be used to present e-mail messages or other messages to the user of alarm clock radio 12 if desired.

Figure 7:
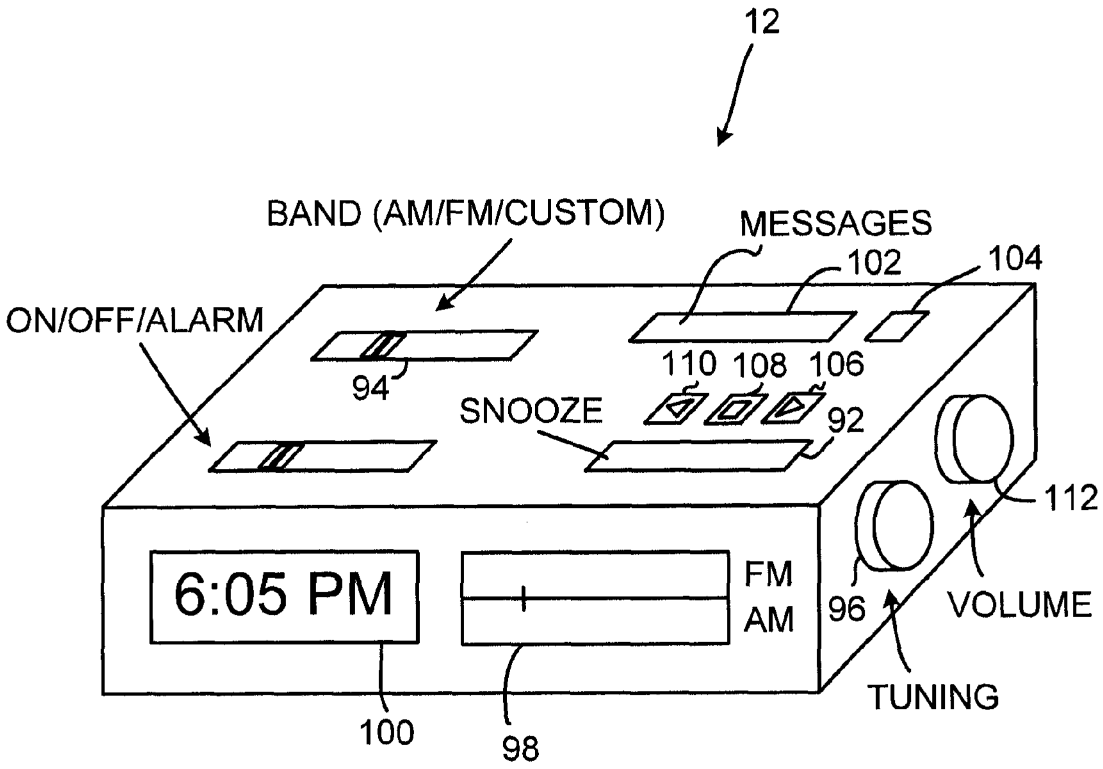
FIG. 7 is a perspective view of an illustrative clock radio in accordance with the present invention.

Alarm clock radio 12 may have a snooze function that allows the user to postpone the wake-up alarm by a few minutes. As shown in FIG. 7, alarm clock radio 12 may have a dedicated snooze button 92 that the user may press to activate the snooze function.

A band-select switch 94 may be used to select between AM, FM, and other audio sources (e.g., Internet radio or news sources or other digital audio content sources, etc.). The switches of alarm clock radio 12 may be based on analog mechanical switches or digital switches or may use combinations of analog and digital switching arrangements.

Alarm clock radio 12 may have tuning controls that allow the user to tune to different audio content. For example, a manual tuning knob 96 or digital tuning buttons may be used to tune to various AM, FM, and Internet stations or the like. Analog or digital readouts may be used to display information on the current station to which the device is tuned. For example, display 98 may be used to display the current AM and FM radio stations to which the alarm clock radio 12 of FIG. 3 is tuned. Information on the current digital audio content for which alarm clock radio 12 is set up to receive may be provided as audio or using a portion of display 100. Display 100 may also be used to display the current time and to display visual feedback when the user is interacting with alarm clock radio 12 (e.g., to adjust certain alarm clock radio settings). Analog tuner readouts may use a needle or other suitable indicator to show which station the radio is currently tuned to. Digital displays may display information identifying the current channel or audio source. AM and FM stations may be labeled by their assigned transmission frequencies. Popular Internet radio stations may be assigned to the dial based on their transmission frequencies in their local market. In situations with duplications, duplicated frequencies may be located one after the other.

Button 102 may be used to retrieve e-mail and voice mail messages. An indicator light 104 may be lit when alarm clock radio 12 has stored voice mail messages or e-mail messages or has been informed that such messages are available (e.g., on a remote e-mail or voice mail server). The user may play retrieved messages using play button 106. Button 108 allows playback to be stopped. Button 110 allows the user to navigate to earlier messages or to access the beginning of a message that is being played.

Volume knob 112 allows the user to adjust the volume of alarm clock radio 12.

Switch 114 may have an off position in which the user may place switch 114 when the user desires to turn of the audio and alarm functions of alarm clock radio 12. Switch 114 may also have an on position. In the on position, alarm clock radio 12 may be used to play music and other audio content from any of its audio sources. When the user desires to be woken up at a particular time, the user may place switch 114 in the alarm position. This causes alarm clock radio 12 to play the audio content that the user has selected using tuning knob 96 or other user interface to the user at the user-selected wake-up (alarm) time. If desired, the user may be provided with an option that allows the user to direct alarm clock radio 12 to play a tone at wake-up time or to play a prerecorded audio clip. The audio clip may be, for example, an MP3 music clip or a MP3 clip of a rooster crowing, etc.

The controls and features of alarm clock radio 12 of FIG. 7 are merely illustrative. Any suitable combinations of controls and features may be provided for alarm clock radio 12 if desired. For example, alarm clock radio 12 may be configured to only handle MP3 files and not streaming Internet audio or may be configured to only handle streaming Internet audio and not MP3 files. Alarm clock radio 12 may also be configured to handle e-mail or not to handle e-mail, etc. One or more buttons (e.g., a dedicated buy button or the like) or on-screen options on a display may be provided to allow the user to purchase products. For example, products may be purchased that are offered in audio advertisements that are provided as streaming digital audio or downloaded digital audio files (e.g., MP3 files). Product purchases may be charged to a credit card, debit card, or other financial account. For example, purchases may be charged to an account of the user that is maintained by a service provider that also provides audio content services or the like for alarm clock radio 12. Products that the user orders may be delivered to the user through the mail or may be provided to the user over communications network 18 (e.g., for software products and music products and the like).

Figure 8A:
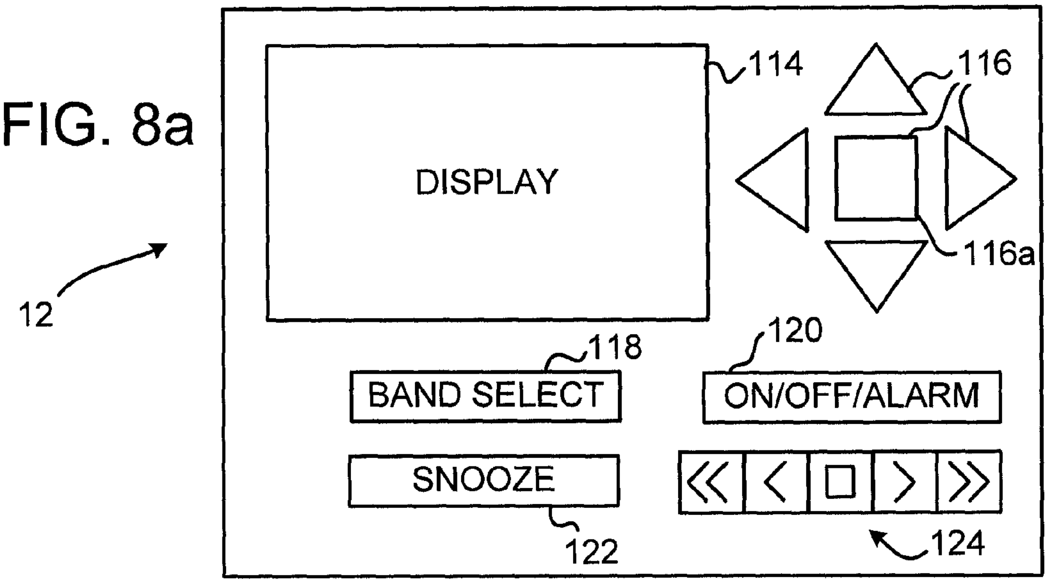
FIGS. 8*a*, 8*b*, and 8*c* are top, front, and side views of an illustrative clock radio in accordance with the present invention.

In arrangements in which alarm clock radio 12 is configured to handle e-mail, e-mail may be viewed on a display such as a liquid crystal display that is part of the audio device. A suitable alarm clock radio 12 with a display 114 is shown in FIG. 8*a*. Navigation buttons 116 may be provided that allow the user to move a cursor through various menus and on-screen options that are displayed on display 114 and that allow the user to make desired selections. The buttons may include up and down and right and left arrow keys and a select or enter key (shown as button 116*a*). These buttons are merely illustrative. Any suitable buttons may be used for navigation and selection of on-screen options if desired.

Band select button 118 may be used to select between bands (e.g., AM, FM, and custom or Internet, etc.). On/off/alarm button 120 may be used to turn the radio in alarm clock radio 12 on or off. Snooze button 122 may be used to activate the snooze function for the alarm. Control buttons 124 may be used to control audio functions including message playback. For example, buttons 124 may be used to fast forward and rewind through various messages.

If desired, voice synthesis circuitry may be used to vocalize e-mail messages so that the user may listen to them. If an e-mail message has a voice attachment, the voice attachment may be played for the user. Alarm clock radio 12 of FIGS. 8*a*, 8*b*, and 8*c* may have built-in telephone functions. If the telephone is not answered, the audio device may store messages like an answering machine. Voice mail messages may be handled by a server (e.g., a server in the telephone network or a server accessible through the Internet such as server 32 or computing equipment 30 of FIG. 2). This server may be accessed by the audio device when it is desired to retrieve and play the user's voice mail.

Figure 8B:
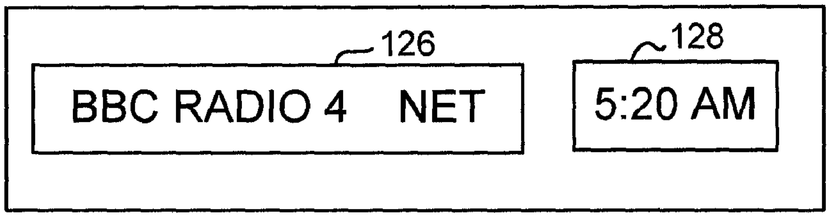

As shown in FIG. 8*b*, the front panel of alarm clock radio 12 may have a display 126 that contains information on the current audio source (e.g., BBC radio 4 NET) and a display 128 that shows the current time. The information "BBC radio 4" designates the Internet radio station to which alarm clock radio 12 is currently tuned. The information "NET" indicates the band—in this case the Internet—from which the audio content is being received. Displays such as displays 126 and 128 and 114 may be combined in a single display or in any suitable combination of displays.

Figure 8C:
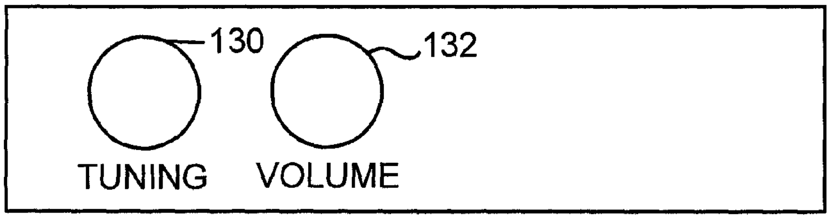

As shown in FIG. 8*c*, alarm clock radio 12 of FIGS. 8*a*, 8*b*, and 8*c* may have a tuning dial 130 for tuning to different stations and a volume dial 132 for adjusting the volume at which audio content is presented to the user.

The arrangement of FIGS. 8*a*, 8*b*, and 8*c* is merely illustrative. The alarm clock radio may be provided with any suitable dedicated buttons to control clock set and alarm set functions, to control e-mail and voice-mail playback, to control the display of e-mail, to control clock set-up functions (e.g., relating to setting the date, the time zone, etc.), to control the snooze function, and to provide easy access to any other suitable functions. For example, buttons may be used to navigate between different audio segments during playback. Buttons may be used to select the types of music to be played. For example, one button may be used to play country music and another button may be used to play rock music. If a suitable display is used (e.g., a touch-screen display with configurable on-screen labels), users may assign labels to certain buttons (e.g., a button may be labeled as the rock music button).

With a digital tuning arrangement, up and down keys such as the up and down arrow buttons 116 of FIG. 8*a* may be used to allow the user to tune to different stations. Because the number of available Internet radio stations may be large (e.g., in the thousands), various layered menus may be used to assist the user in locating a station of interest. For example, menus may be presented on a display panel that allow the user to select Internet radio content based on geographic region, language of the content, or type of content (e.g., adult contemporary, alternative, blues, classical, news, sports, police radio, etc.). Internet radio stations may also be listed alphabetically or using any other suitable organization scheme. These organizational arrangements may be used to assist the user in locating audio content from a variety of sources, including AM, FM, short-wave radio (if the radio has short-wave capabilities), non-Internet digital radio services provided over a broadband communications network, Internet radio, downloaded audio files, etc.

Figure 9A:
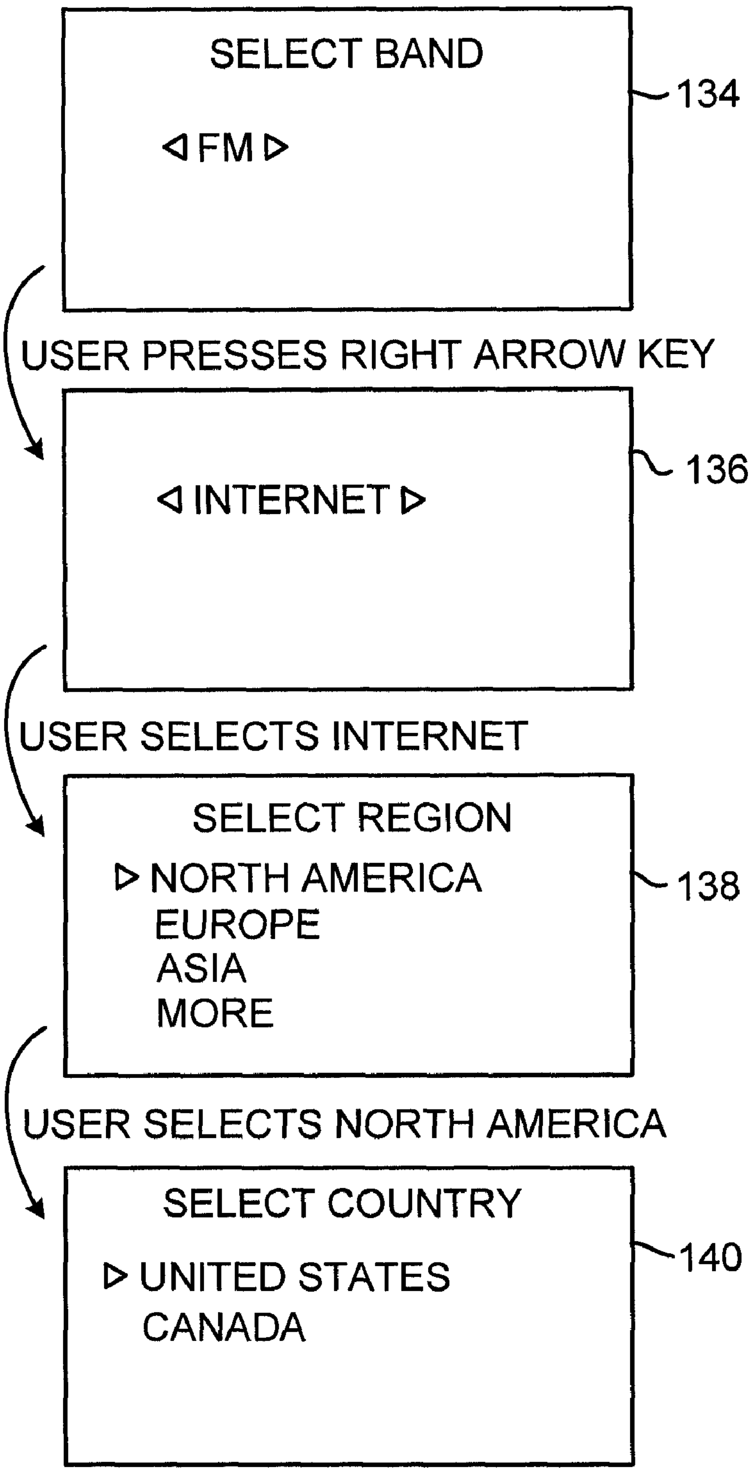
FIGS. 9*a* and 9*b* show illustrative steps involved in providing a user with an opportunity to select desired content for an audio device using a local interface in accordance with the present invention.
Figure 9B:
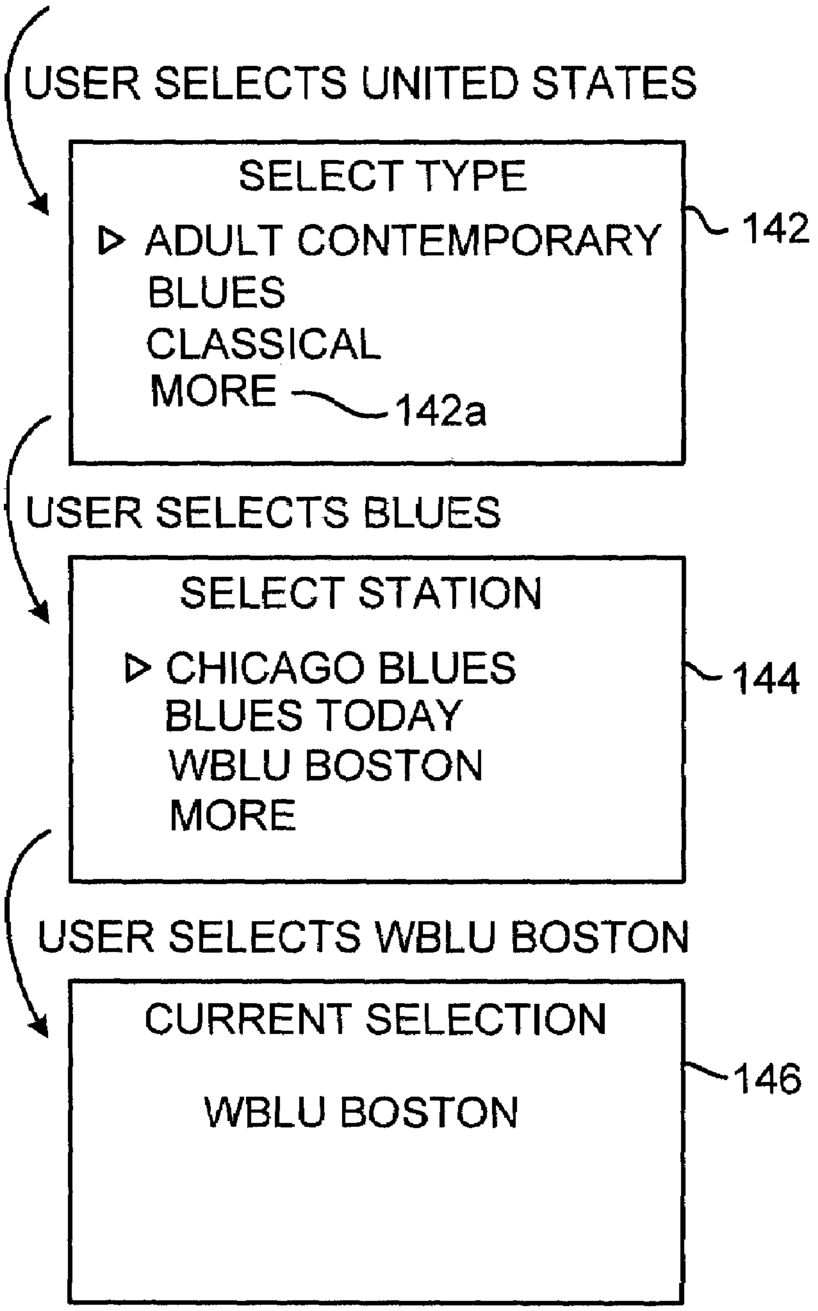

An illustrative series of menus that may be displayed on a display such as display 114 of FIG. 8*a* and that may be selected using buttons such as buttons 116 of FIG. 8*a* are shown in FIGS. 9*a* and 9*b*.

Initially, alarm clock radio 12 may display a menu such as menu 134 that asks the user to select a band. As indicated by the arrows adjacent to the default band (FM), the user may press right and left arrow buttons 116 (FIG. 8*a*) to select the desired band. In the example of FIG. 8*a*, the user selects the Internet band by pressing the right arrow button 116. This causes alarm clock radio 12 to display menu 136 on display 114.

After highlighting the desired band using the right and left arrow buttons 116, the user may press the enter key 116*a* to direct the alarm clock radio 12 to continue. If the user presses enter key 116*a* while the Internet band is displayed in menu 136, alarm clock radio 12 may display a menu such as select region menu 138. Menu 138 allows the user to choose a geographic region of interest. The use of a geographical classification scheme is merely illustrative. Any suitable classification hierarchy may be used if desired.

In the example of FIG. 9*a*, the user has used keys 116 to select the North American region. Alarm clock radio 12 may therefore display a country select menu 140. After the user has selected a country (e.g., the United States), alarm clock radio 12 may display a menu such as select type menu 142 of FIG. 9*b*. Select type menu 142 may provide the user with an opportunity to select a desired content category. For example, the user may select from music categories such as adult contemporary, blues, classical, etc. The user may access additional categories by selecting more option 142*a* or by using keys 116 to scroll through the categories. If desired, some of the categories may be for content such as news and other categories that are not directly related to music.

When the user selects a desired category of audio content (e.g., blues music), alarm clock radio 12 may present a menu such as select station menu 144. Select station menu 144 may contain a list of various station titles, channel titles, or the other service titles or identifiers or the like. The stations may be broadcast stations (e.g., WBLU Boston) that have been retransmitted over the Internet as streaming audio or may be stations that are made up of content that is delivered only over the Internet or other communications network, but is not delivered using traditional over-the-air broadcasting techniques. The stations may also be customized stations that have been created by the user or other users. The content for such customized stations may be delivered from any suitable platform such as computing equipment 40 of service provider 36.

When the user selects a desired station (e.g., WBLU Boston), alarm clock radio 12 may present a screen such as current selection screen 146. Current selection screen 146 may contain information on the currently selected station (e.g., the station's title, call letters, content category, etc.), or any other suitable information. The audio for the current station may be played through speakers 60 (FIG. 2).

Figure 10A:
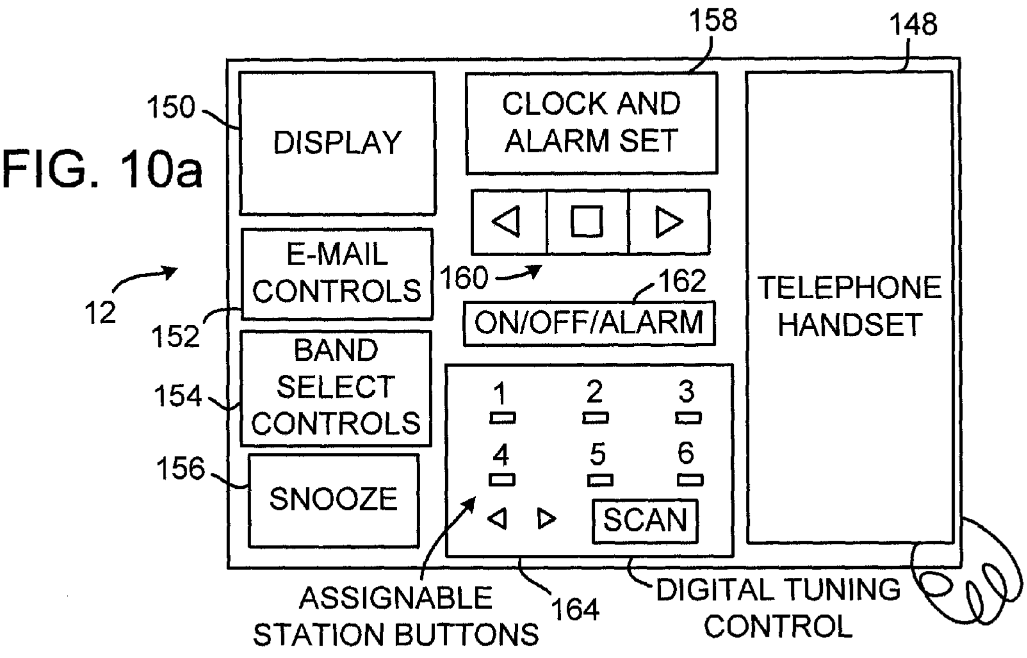
FIGS. 10*a*, 10*b*, and 10*c* are top, side, and front views of an illustrative clock radio with telephone capabilities in accordance with the present invention.
Figure 10B:
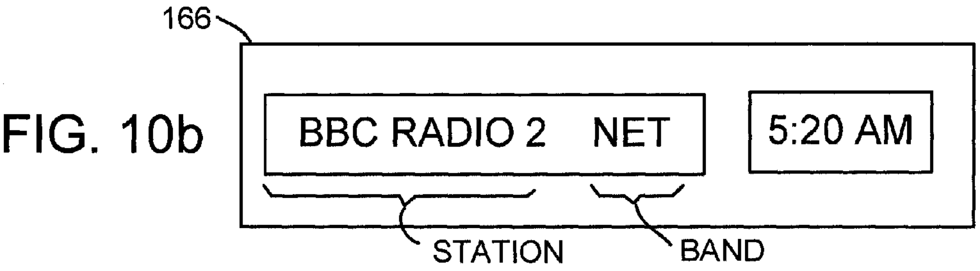
Figure 10C:
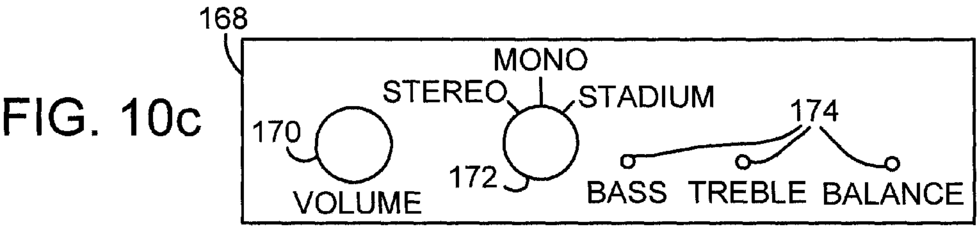

An illustrative alarm clock radio 12 with a telephone handset 148 is shown in FIGS. 10*a*, 10*b*, and 10*c*. As shown in FIG. 10*a*, alarm clock 12 may have a display 150 for displaying e-mail, on-screen options, or other suitable information. For example, display 150 may be used to display on-screen options that allow the user to electronically order products. E-mail controls 152 may be used for managing e-mail messages. Band select controls 154 may be used to select a desired band (e.g., AM, FM, Internet, etc.) Snooze control button 156 may be used to postpone the alarm function of alarm clock radio 12 after the alarm has been triggered at wake-up time. Clock and alarm set controls 158 may be used to adjust the clock time and the wake-up time for the alarm.

Alarm clock radio 12 may also have buttons 160 for playing, deleting, skipping, and reviewing messages, and performing any other suitable message management functions for e-mail and voice mail. If desired, a button or buttons on the audio device (e.g., one of e-mail controls 152) may be used to forward e-mail messages. Such buttons may be used when the user has more than one e-mail address. For example, the user may use one e-mail address for the audio device at home and another e-mail address for work. The user may press one or more of the buttons to forward all or some of the e-mail messages to the computer at work. If, for example, the user has just listened to or viewed an e-mail message using the audio device, the user may press a button that deletes that e-mail message from the audio device's e-mail list and forwards it to the user's work e-mail address. If desired, the audio device may be assigned the same e-mail address as the user's work address. Voice mail may also be forwarded using a dedicated button or buttons.

Alarm clock radio 12 of FIG. 10*a* may have an on/off/alarm control 162. When control 162 is set to on, the radio portion of alarm clock radio 12 is turned on. When control 162 is set to off, the radio portion of alarm clock radio 12 is turned off. When control 162 is set to alarm, the radio portion of alarm clock radio 12 is turned off, but an alarm buzzer or the radio portion of alarm clock radio 12 will be activated as an alarm at wake-up time.

Alarm clock radio 12 may have assignable station buttons and tuning and scan controls 164. When a button has been assigned to a particular station or type of audio content, the user may press that button to tune to that station or to direct alarm clock radio 12 to play that type of audio content. Arrow keys or other such controls in controls 164 may be used to direct a digital tuner to tune to or otherwise select the appropriate radio station or other audio content. A scan button may be used to direct alarm clock radio 12 to sequentially scan through each of the stations in a list of stations. Audio segments of a second or so in duration may be automatically played from each station, so that the user may listen for stations of interest. If the user hears a station of interest, the user may press the scan button to stop scanning.

As shown in FIG. 10*b*, the current station, band and current time may be displayed on alarm clock radio 12 using displays on the front-panel 166 of alarm clock radio 12.

As shown in FIG. 10*c*, alarm clock radio 12 may have various controls on one or both side panels 168. For example, a volume dial 170 may be used to adjust the volume of alarm clock radio 12. An audio mode selection switch 172 may be used to control the type of audio playback mode that alarm clock radio 12 uses to play back audio to the user (e.g., stereo, mono, or special audio effects that simulate environments such as a stadium, a theater, etc.). Controls 174 may be used for audio controls such as bass and treble control and control of the balance (if alarm clock radio 12 uses stereo speakers).

Figure 11A:
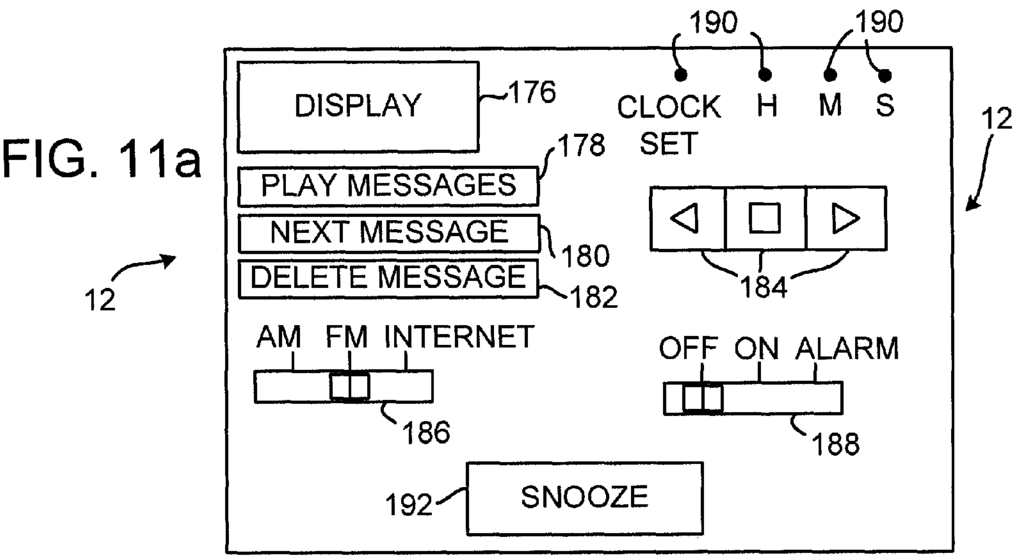
FIGS. 11*a*, 11*b*, 11*c*, and 11*d* are top, front, side, and rear views of an illustrative clock radio with messaging capabilities in accordance with the present invention.

Another illustrative alarm clock radio 12 is shown in FIGS. 11*a*, 11*b*, 11*c*, and 11*d*. As shown in FIG. 11*a*, alarm clock radio 12 may have a display 176 for displaying information and on-screen options for the user. Play messages button 176 may be used to play text e-mail messages for the user using voice synthesis and may be used to play audio attachments to e-mail messages. Next message button 180 may be used to skip to the next message in a list of messages. Delete message button 182 may be used to delete messages. Buttons 184 may be used to rewind, stop, and play messages. Band control switch 186 may be used to select a desired radio band (e.g., AM, FM, or Internet). Switch 188 may be used to turn the radio portion of the clock on or off or may be used to turn the alarm on. Control buttons 190 may be used to set the clock time and the alarm time of alarm clock radio 12. Snooze button 192 may be used to delay the alarm.

Figure 11B:
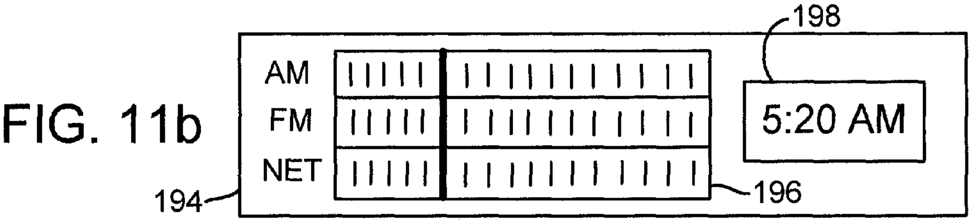

Front panel 194 of alarm clock radio 12 may have display 196 that indicates the present frequency or station to which the user has tuned, as shown in FIG. 11*b*. AM, FM, and Internet bands may be displayed. Internet radio stations may be assigned to their usual broadcast frequencies or may be reassigned to arbitrary frequencies or station numbers. A display such as display 198 may be used to display the current time.

Figure 11C:
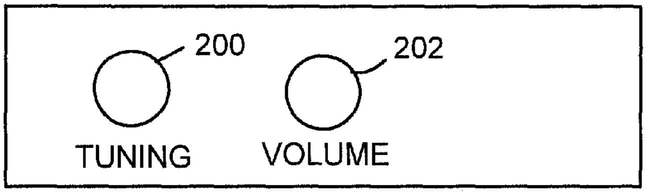

As shown in FIG. 11*c*, alarm clock radio 12 may have a tuning knob 200 and a volume knob 202.

Figure 11D:
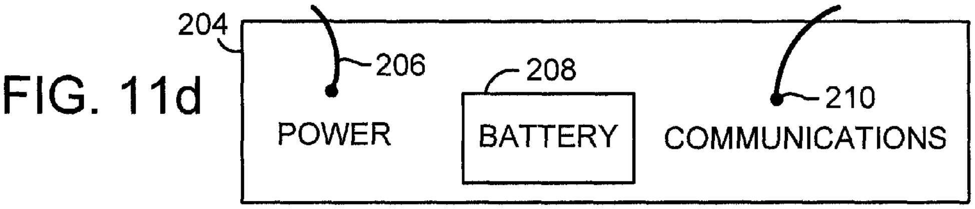

Rear panel 204 of alarm clock radio 12 is shown in FIG. 11*d*. Rear panel 204 may have a power cord 206 (e.g., an AC power cord for accepting AC power from a household outlet). Rear panel 204 may also have a battery compartment and battery 208. Battery backup or capacitor backup may be used to prevent alarm clock radio 12 from losing its settings or data when the power delivered by cord 206 is interrupted. Rear panel 204 may have a communications port 210 for connecting alarm clock radio 12 to an in-home network, a telephone line, a cable or fiber-optic line, etc.

The user may opt to be awakened by music, news, e-mail, voice mail, a standard alarm buzzer, advertisements, or content from any other suitable audio source or combination of sources.

The audio from these sources may be combined to form customized channels made up of portions of the various sources. For example, if the user enjoys country music, classical music, and sports news, these types of content may be combined (e.g., from Internet radio channels) into a custom channel. The user may schedule how portions or segments of the audio from various sources are to be played. For example, the user may select the content and the duration for desired audio segments. Customized content may be provided to the user by the audio device based on the user's interests.

Figure 12:
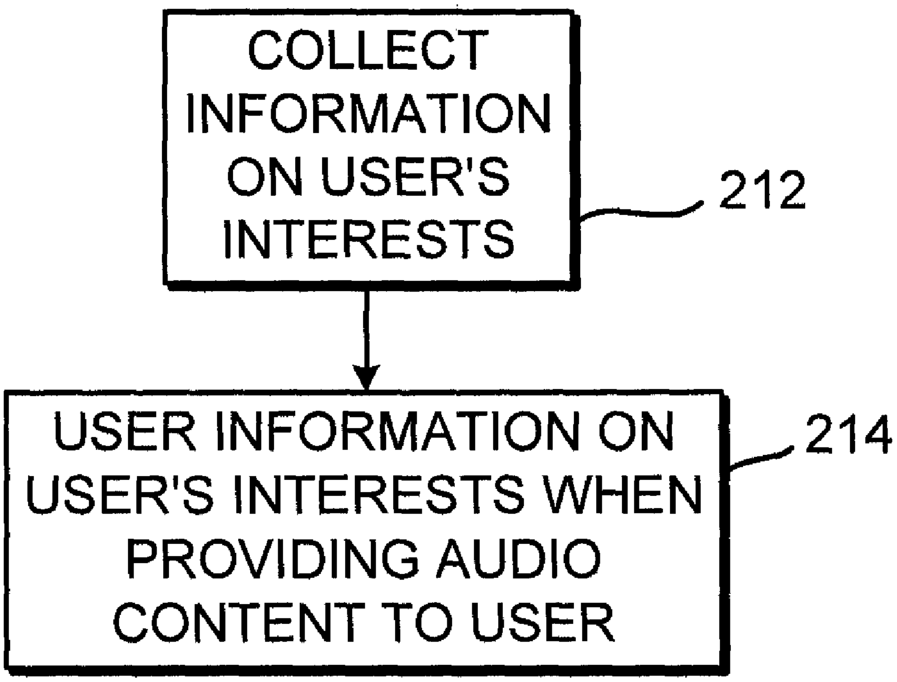
FIG. 12 is a flow chart of illustrative steps involved in customizing audio content for the user in accordance with the present invention.

Illustrative steps involved in using information on the user's interests when providing audio content to the user are shown in FIG. 12. At step 212, information is collected on the user's interests. For example, alarm clock radio 12 may be informed of the user's interests by the user or the user may inform a service associated with the alarm clock radio (e.g., a service implemented on a server accessed over the Internet) of the user's interests. Information on the user's interests may also be collected automatically by monitoring the user's activities (e.g., by monitoring which stations the user listens to most often). If desired, the user's interests may be determined based on the user's interactions with web sites on the Internet that are not directly associated with alarm clock radio 12 (e.g., the user's interactions with a web site that sells compact disks or the like). Information on the user's interests may be provided to a service (e.g., an Internet-based service) that coordinates the delivery of customized audio content to the alarm clock radio for the user.

At step 214, the information on the user's interests that has been collected at step 212 may be used when providing audio content to the user. For example, if the information has been collected at computing equipment associated with a service provider or other entity, the computing equipment of the service provider or other entity may stream customized audio content to alarm clock radio 12. The computing equipment may also provide customized audio files (e.g., customized MP3 files or the like) to the alarm clock radio 12 as downloads.

In order to maintain a small size for the alarm clock radio 12, alarm clock radio 12 may not have a display or may use a small display. It may therefore be desirable to provide an off-site service with which the user may interact to establish certain settings (e.g., content customization settings) for alarm clock radio 12. The settings may be downloaded to alarm clock radio 12 for use by the alarm clock radio 12 or may be used by the service in determining which types of content to provide to the user and in determining what features to provide to the user.

For example, an off-site service (e.g., a service associated with alarm clock service provider 24 of FIG. 1, service provider 36 and computing equipment 40 of FIG. 2, computing equipment 30 of FIG. 2, any of the other servers or sources of FIGS. 1 and 2, or associated with any other suitable equipment or entity) may provide a web page that the user may interact with using a computing device such as personal computer 28 of FIG. 1 that is separate from the alarm clock radio 12. If there are certain preferences or settings that the user wants to adjust (e.g., favorite Internet radio stations that the user wants the radio to tune to, certain wake-up sequences of music, e-mail, and the like, or certain other settings), the user may provide information on those preferences and settings using the web page.

Figure 13:
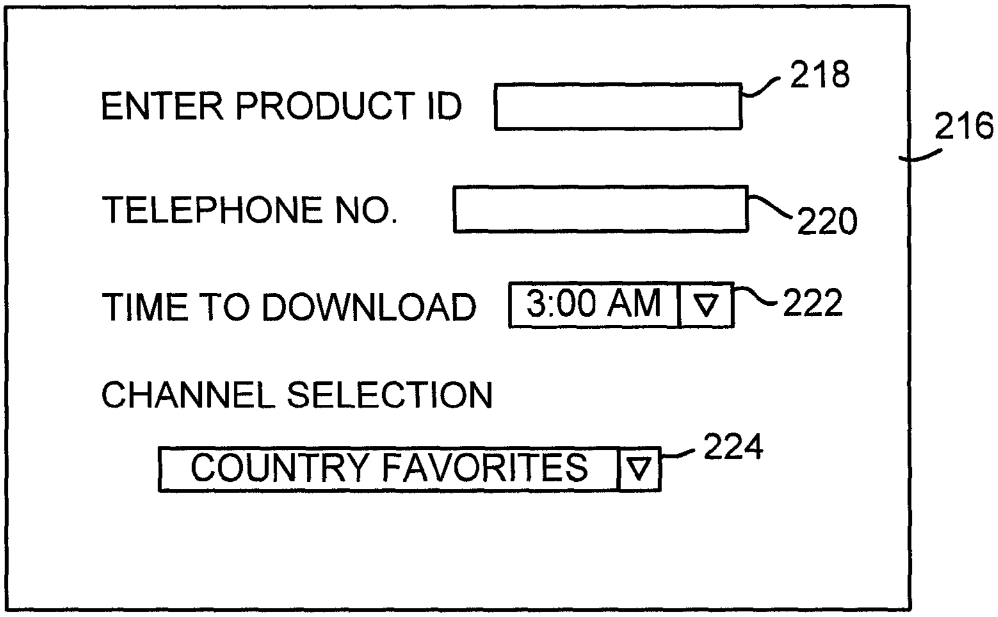
FIG. 13 shows an illustrative screen (e.g., a web page) that may used to remotely select a desired download time and a preferred type of audio content for the audio device in accordance with the present invention.

As an example, alarm clock radio 12 may allow a user to set up 25 favorite stations. These stations may include, for example, Internet radio stations. Because hundreds or thousands of stations are available, a web page including information on various available stations may be used to help the user select the desired stations. An illustrative web page 216 is shown in FIG. 13. Web page 216 may be sponsored by a service associated with alarm clock radio 12, may be a general directory, may be part of a radio station web site, or may be any other web page or Internet or network content. If desired, web page 216 may have a product ID region 218 in which the user may enter a product ID or other suitable identifier that indicates to the service that the user is authorized to use the service. A product ID may be provided to the user with the product when the product is sold to the user or may be assigned to the user when the user subscribes to the service. Web page 216 may include region 222 in which the user may provide a telephone number or e-mail address or other communications address information. The product ID may also contain information that is used (alone or in combination with the telephone number or other such information) to identify alarm clock radio 12 sufficiently that customized content may be delivered to alarm clock radio. The telephone number or other communications address information may be used by audio content providers in calling alarm clock radio 12 to establish a communications link with alarm clock radio 12 (e.g., to deliver content to alarm clock radio 12). The time at which a content provider should establish a link with alarm clock radio 12 to deliver content may be selected by the user using option 222.

Web page 216 may contain a station or channel selection option 224. The user may select a desired category of music from a list of available content categories using option 224. If desired, a web page interface may be used that allows the user to set up the stations for alarm clock radio 12 that the user is interested in by clicking on links for stations that the user is interested in or by otherwise selecting the proper Internet addresses for the desired stations. Information on both non-Internet radio stations and Internet radio stations may be gathered using a remote interface such as a web page interface.

Figure 14:
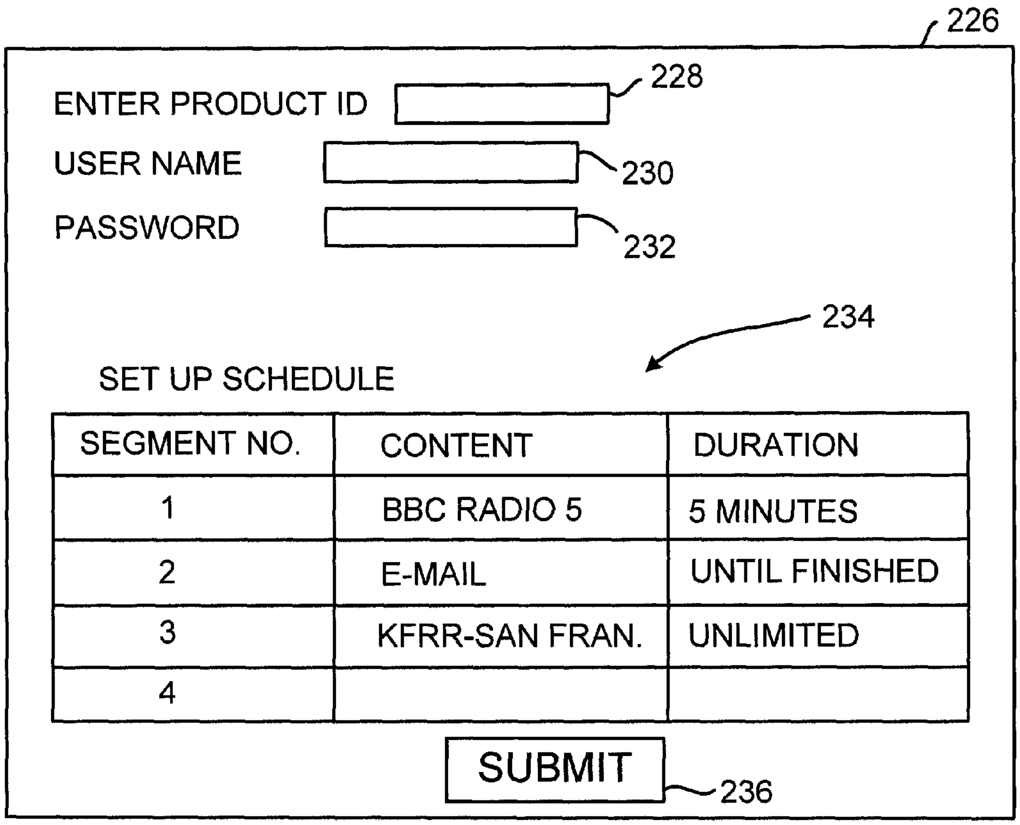
FIG. 14 shows an illustrative screen (e.g., a web page) that may be used to remotely select a desired schedule for various audio segments to be played by an alarm clock upon wake-up in accordance with the present invention.

If desired, a web page or other suitable remote interface may be used to allow the user to set up a schedule of content to be played by alarm clock radio 12 upon wake-up. For example, a web page such as web page 226 of FIG. 14 may be provided by a server associated with, for example, an alarm clock service provider such as alarm clock service provider 24 of FIG. 1. Web page 226 may include a region 228 in which to enter a product ID or other identifier. The product ID may be used to uniquely identify alarm clock radio 12 so that customized content may be addressed to that particular alarm clock radio. The product ID may also serve to indicate that the user is authorized to use the web page interface. If desired, alarm clock radio 12 may be assigned an e-mail address or other suitable communications address that may be used to uniquely identify alarm clock radio 12 so that content may be addressed to the clock.

Regions 230 and 232 may be provided so that the user may enter information that allows the server providing web page 226 to verify the identity of a user who has previously signed up with the alarm clock service provider. During the sign up procedure, the user may enter a product ID, a user name, and a user-defined password. When sign-up is complete, the user may access the server from a personal computer such as user's computer 28 to remotely adjust the settings of alarm clock radio 12.

For example, the user may use region 234 to set up a content delivery schedule for the user's alarm clock radio 12. Initially, region 234 may be blank for each segment. The user may click on a blank cell in the content column with a pointing device. The user may be allowed to select from various content options using, for example, a drop-down menu, a pop-up list, direct alphanumeric entry, or any other suitable user interface. After the user has selected the desired content for a given segment, the user may click on the corresponding cell in the duration column to supply a desired duration. The user may submit the selections by clicking on submit option 236.

If desired, the user's content selections, duration selections, and other configuration selections may be stored by the server at the alarm clock radio service provider or other suitable source or other entity until it is time to deliver content to alarm clock radio 12. When the content is delivered, the delivered content may be customized based on the user's selections. For example, downloaded files or streaming content may be customized based on the user's selections.

The user's content selections, duration selections, and other configuration settings may also be distributed to the alarm clock radio 12 for use in filtering content at alarm clock radio 12. With this type of arrangement, content may be simultaneously delivered to alarm clock radio 12 from multiple sources. Alarm clock radio 12 may accept or retain only those files or content streams that match the user's selections.

If desired, station preference information that is gathered using a web page interface such as web page 226 may be provided to alarm clock radio 12 and stored in memory. When the user presses up and down tuning buttons on alarm clock radio 12, alarm clock radio 12 may tune to the next available station in a group of stations selected by the user. Dedicated buttons (e.g., number buttons) may each be assigned a different Internet radio station or other audio source if desired, to facilitate direct tuning. Internet radio stations and other audio sources may also be assigned to custom station names that are accessible through the display panel. Alarm clock radio 12 may provide a scan feature that the user may invoke using a dedicated button or a menu option presented to the user on a display. If the user directs the audio device to scan, the device may tune to each of the available stations in the current band. If desired, scanning may be limited to a portion of a band or may be limited to the stations in the user's preferences.

Alarm clock radio functions that may be controlled using a remotely-accessed service such as a web-based service or the like include setting the wake-up time for alarm clock radio 12, choosing a desired type of content (classical music, rock music, certain Internet radio stations, customized stations, e-mail, news, stock reports, weather reports, etc.) to play upon wake-up with alarm clock radio 12 and in what order and for what durations to play such content, choosing clock settings such as time zone, daylight savings time, etc. These settings and preferences may be used in providing services to alarm clock radio 12 (e.g., when downloading content in advance or providing content in real time) or may be provided to alarm clock radio 12 and stored for local use by alarm clock radio 12. Web page interfaces such as the illustrative web page interfaces of FIGS. 13 and 14 or any other remotely accessible interfaces may be used to adjust the settings and preferences of alarm clock radio 12. If desired, a locally accessible interface (e.g., a web page interface or other suitable user interface) may be used to control or establish settings for alarm clock radio 12 over a local communications link (e.g., an intranet link or an in-home network or wired or wireless links of the type shown in FIG. 3).

A remote service for adjusting settings and preferences may be based on an Internet interface and accessed by the user with a separate web browser (e.g., a web browser implemented on user's computer 28 of FIG. 1), may be based on an Internet interface and accessed with a web browser that is part of the alarm clock radio hardware, may be based on an automatic interactive telephone system that plays audio prompts for the user and responds when the user presses certain touch-tone keys on a telephone keypad, may be based on an operator-manned customer service facility in which an operator enters settings into a computer after talking to the user or receiving an e-mail from the user, or any other suitable scheme in which settings and preferences and the like are adjusted using equipment that is remote from alarm clock radio 12. Settings and preferences may also be adjusted using dedicated buttons on alarm clock radio 12 or using menu options or the like that are provided locally by alarm clock radio 12 when alarm clock radio 12 has a suitable display.

Figure 15:
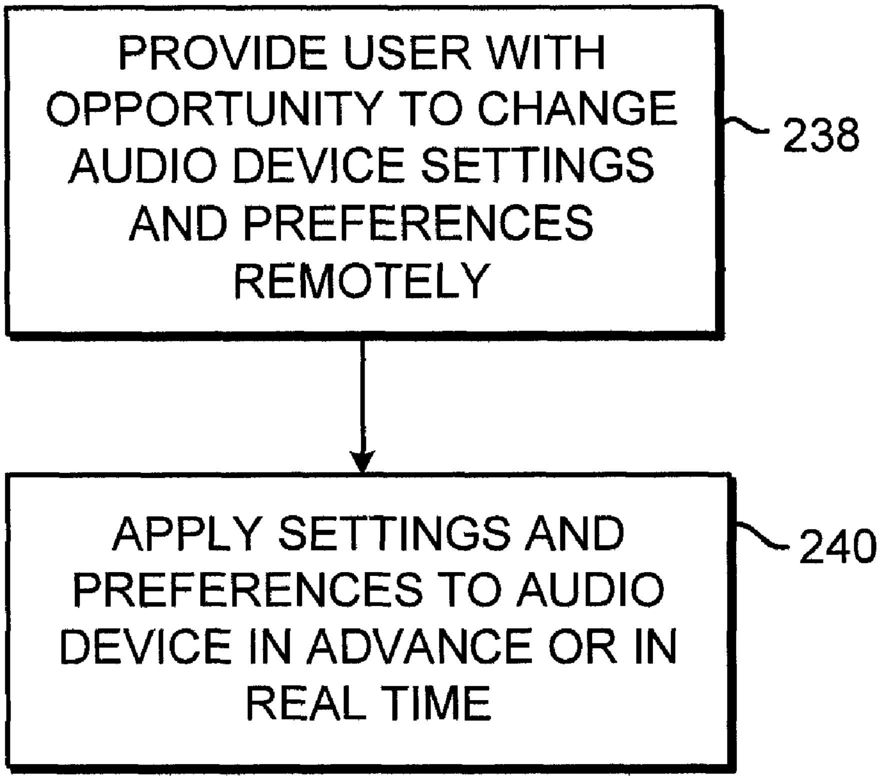
FIG. 15 is a flow chart of illustrative steps involved in remotely changing settings and preferences for the audio device in accordance with the present invention.

Illustrative steps involved in adjusting settings for alarm clock radio 12 remotely are shown in FIG. 15. At step 238, a remote server or other suitable user equipment (e.g., computing equipment in the home that communicates with alarm clock radio 12 over a wired or wireless in-home network) may be used to provide the user with an opportunity to change the settings and preferences for alarm clock radio 12 (or other such audio device) remotely. For example, a remote server or a computer on the user's home network may provide the user with a web page interface or other suitable user interface that allows the user to adjust various settings and preference options. At step 240, the settings and preferences may be applied to alarm clock radio 12 (or other such audio device). The settings and preferences may be applied in advance (e.g. by storing information on the settings and preferences in alarm clock radio 12 for use when content is provided or made available). Settings and preferences may also be applied in real time (e.g., by filtering out all but the user's preferred types of audio content as the user receives real-time streaming audio or the like). These are merely illustrative examples. Any suitable arrangements may be used to allow the user to adjust settings and preferences remotely at step 238 and to apply such settings and preferences to alarm clock radio 12 at step 240.

Audio clip descriptions may be provided for each radio station. When the user selects a suitable option, alarm clock radio 12 may play the audio clip description. This allows the user to evaluate whether to add a station (e.g., an Internet radio station) to the tuning sequence of alarm clock radio 12 without requiring a large display panel on alarm clock radio 12 to display text descriptions of the channel.

Alarm clock radio 12 preferably has clock circuitry and a display (analog or digital) that shows the current time. The time may be set automatically by the device. For example, the device may contact an Internet service such as clock time server 26 of FIG. 1 to check the current time or may be provided with data on the current time from computing equipment such as clock time server 26. Multiple users may set different alarm times and profiles using the same clock. For example, one user may establish an early wake-up time and a profile reflecting an interest in rock music, while another user may establish a later wake-up time and a profile reflecting an interest in classical music.

By using an auxiliary audio output such as audio output 62 of FIG. 2, alarm clock radio 12 may supply an audio output suitable for use in a stereo system or other such home entertainment components. Any of the functions of alarm clock radio 12 may be provided in a stand-alone radio or other electronic audio or audio-visual entertainment component.

Voice recognition technology may be used for controlling alarm clock radio 12. For example, voice recognition may be used to allow a user to direct alarm clock radio 12 to forward e-mail messages or voice mail messages, to navigate through audio segments or to select a desired type of music to play, to direct an alarm clock to switch from playing an alarm buzzer to playing music, or to perform any other suitable functions.

Alarm clock radio 12 may be located in the home or in any other suitable location. If desired, the functions of alarm clock radio 12 may be implemented using a mobile platform such as a car radio, automobile personal computer, etc. A suitable communications link for such a mobile platform may be based, for example, on wireless terrestrial links such as wireless bidirectional cellular links, broadcast digital data, or a combination of such arrangements or any other suitable wireless technology.

The user may be provided with the ability to block objectionable audio content. Content may be blocked based on ratings information that is associated with the audio content. Such ratings information may be provided by the audio source that supplies the audio content or a third party service that collects or creates the ratings information. Content may be blocked locally (e.g., at alarm clock radio 12) or may be blocked remotely (e.g., at an audio service such as a centralized service like alarm clock service provider 24 of FIG. 1 or other suitable service provider that serves to collect and distribute audio content to alarm clock radio 12).

The user may order products or services using alarm clock radio 12. Any suitable buttons or keys or on-screen options displayed on a display on alarm clock radio 12 may be used to provide the user with an opportunity to purchase a product or service. Alarm clock radio 12 may transmit orders over communications network 18 (e.g., the Internet). Orders may be processed and fulfilled by a service provider or other suitable entity. For example, orders may be processed by a service provider that uses computing equipment such as computing equipment 30 of FIG. 2 to handle orders. Products may be delivered to the user by mail or a delivery service. If desired, the user's address may be provided to the service provider from another service provider that is involved in providing services to alarm clock radio 12. For example, if the user subscribes to an audio content service and has provided address and billing information to the audio content service, the audio content service may provide this information to an on-line merchant (e.g., when the user places an order for a product or service using alarm clock radio 12).

Software and audio content products and services that have been purchased may be delivered to the user over communications network 18. For example, MP3 music files may be delivered to alarm clock radio 12 in this way. Alarm clock radio 12 may maintain a collection of such downloaded music files that the user may access using buttons or on-screen options. The user may direct alarm clock radio 12 to play back such downloaded audio files at the time set for the alarm or whenever the user desires to listen to the audio files.

Figure 16:
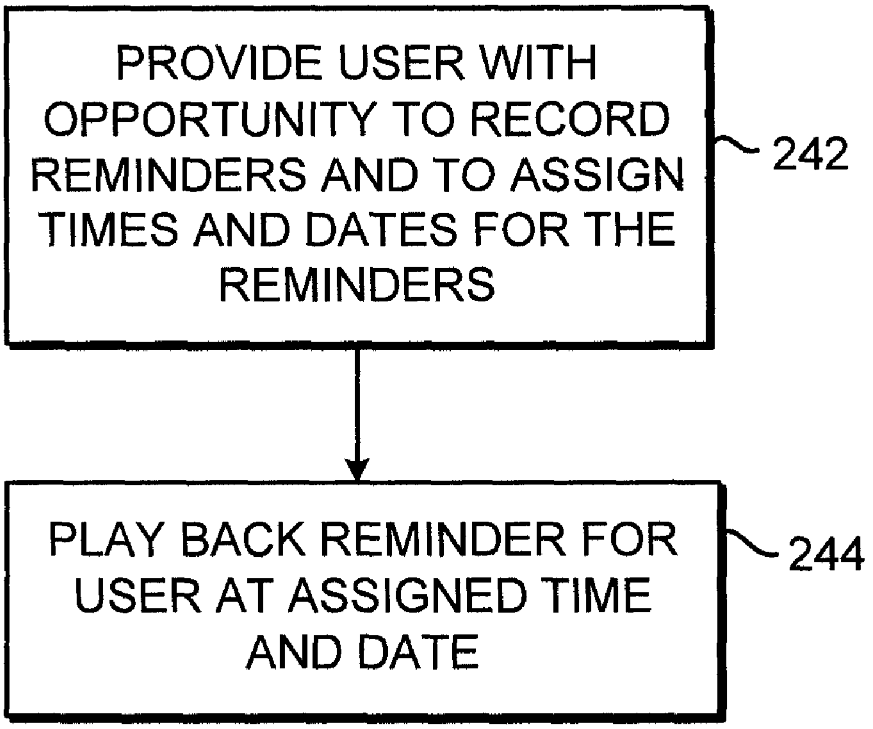
FIG. 16 is a flow chart of illustrative steps involved in using the alarm clock radio for calendar functions in accordance with the present invention.

The user may use alarm clock radio 12 to record reminders using a calendar function. Illustrative steps involved in providing calendar functions are shown in FIG. 16. At step 242, the user may be provided with an opportunity to record reminders and to assign times and dates for the reminders. For example, the user may record a reminder for a business meeting or a social engagement. When the date arrives, the reminder may be played back at step 244.

The user may enter text for the calendar using an alphanumeric keypad, a touch screen, or any other suitable user interface on alarm clock radio 12. An alphanumeric keypad may also be used to help the user select Internet radio stations by their full name (e.g., BBC radio 5) or to provide alarm clock radio 12 with any suitable alphanumeric commands. If desired, the user may adjust calendar settings remotely (e.g., using user's computer 28 of FIG. 1) to adjust settings over the Internet or using a computer connected to alarm clock radio 12 over an in-home network such as the in-home network of FIG. 1*a*. For example, the user may create a calendar entry for alarm clock radio 12 while the user is at work. The calendar entry may be used to remind the user of an activity or event over the weekend, when the user is away from work. The calendar entry or reminder may be used as a wake-up alarm or may be assigned to a time of day other than wake-up time.

Figure 17:
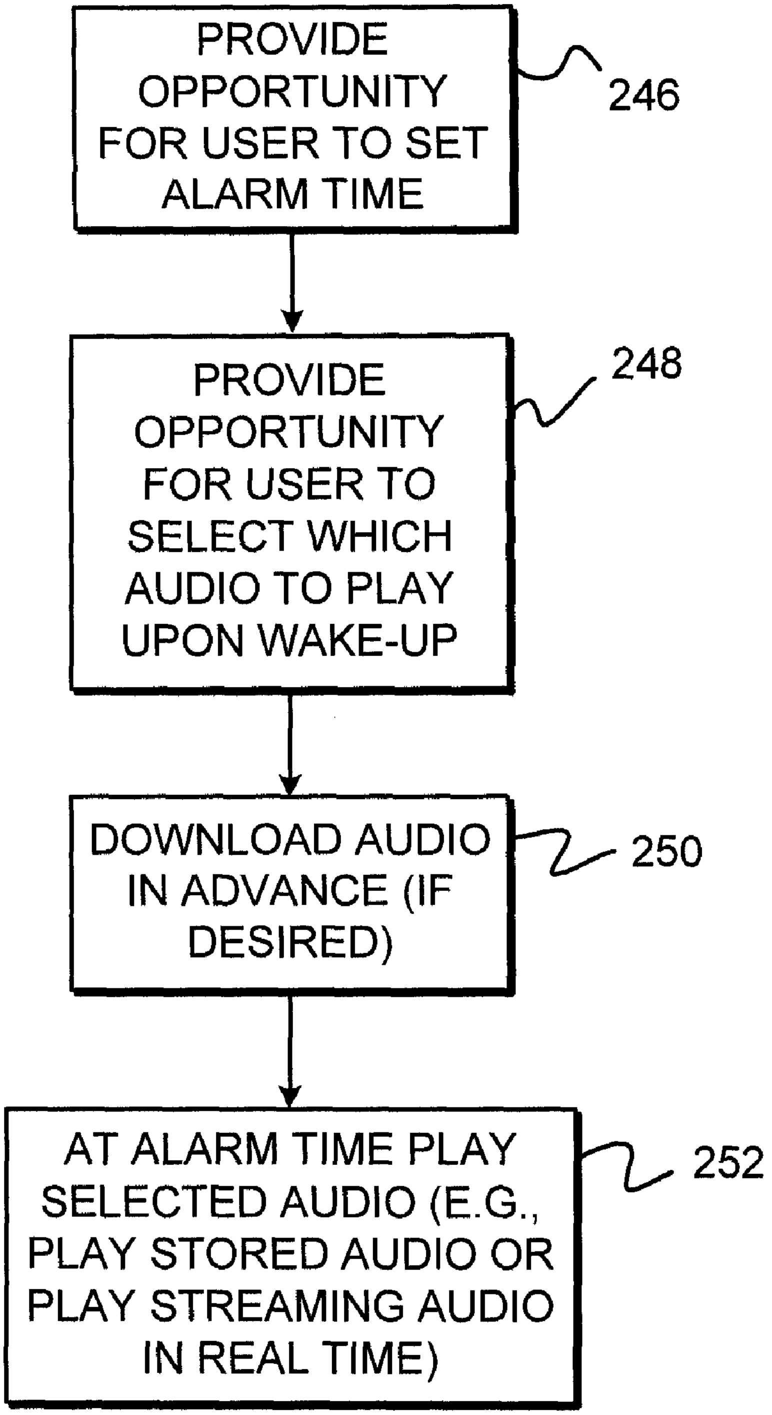
FIG. 17 is a flow chart of illustrative steps involved in using a clock radio in accordance with the present invention.

Illustrative steps in using alarm clock radio 12 as an alarm clock are shown in FIG. 17. At step 246, the user may be provided with an opportunity to set an alarm time. For example, the user may be provided with an opportunity to use a web interface to remotely set an alarm time. The user may also use buttons or on-screen options provided by alarm clock radio 12 to set the alarm time. If desired, a personal computer or other device that communicates locally with alarm clock radio 12 over an in-home network may be used to set the alarm time.

At step 248, the user may be provided with an opportunity to select which audio content alarm clock radio 12 is to present upon wake-up. For example, the user may be provided with a web interface that the user may access remotely to set the wake-up content configuration. The user may also select which audio content is to be played using buttons on alarm clock 12 or on-screen options provided on a display on alarm clock radio 12. If desired, the user may select the wake-up content over a local in-home network.

At step 250, audio content may be downloaded to alarm clock radio 12 to be used at wake-up. For example, MP3 audio files or other suitable audio content may be downloaded to alarm clock radio from one of the sources of FIG. 2. If audio content is to be provided as a real time digital audio stream, step 250 may be omitted.

At step 252, alarm clock radio 12 may play appropriate audio content for the user at the time set for the alarm. Alarm clock radio 12 may use an internal clock circuit or a clock function implemented on a microprocessor or other processor to determine the time and to compare the current time to the time set for the alarm. The content played for the user at step 252 may be downloaded audio content (e.g., stored MP3 files that were downloaded at step 250) or may be real-time streaming digital audio. The playback of streaming audio may be initiated by alarm clock radio 12 based on the alarm time set in alarm clock radio 12 (e.g., alarm clock radio 12 may request streaming digital audio content or may tune to streaming audio content that is already being provided from a remote content source). If desired, the playback of streaming audio content may be initiated by the remote content source.

Audio service may be provided to the user at alarm clock radio 12 with or without advertisements. This may affect the cost of the service to the user. For example, an Internet radio station or news service or other audio service without commercials may charge a subscription fee, whereas services with advertisements may be received for free.

Figure 18:
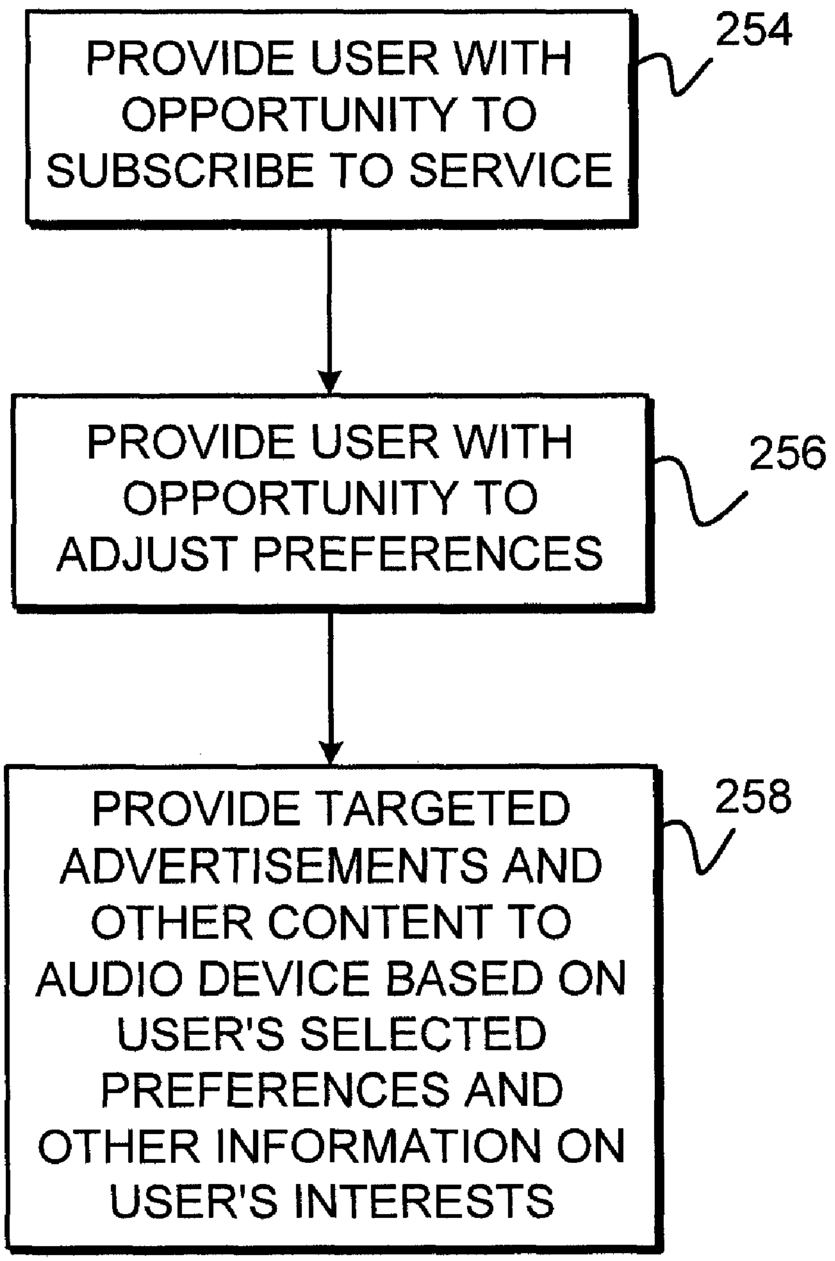
FIG. 18 is a flow chart of illustrative steps involved in targeting advertisements and other content to the user based on the user's preferences in accordance with the present invention.

Illustrative steps involved in providing the user with content using a subscription-based service are shown in FIG. 18. At step 254, the user may be provided with an opportunity to subscribe to the service. For example, a service provider associated with the service may use computing equipment (e.g., a remote server) to provide a web page or other interface that the user may use to sign up for the service on-line. The user may access the web page using user's computer 28 or a computer in the user's home. If desired, the user may be provided with interactive on-screen options or audio prompts at alarm clock radio 12 by using alarm clock radio 12 to communicate with a server or other equipment associated with a remote service provider that provides interactive subscription functions. The user may also subscribe to the service by telephone (by interacting with a customer service representative or automatic telephone order-processing equipment), by mail, or using any other suitable technique.

At step 256, the user may be provided with an opportunity to adjust preferences such as content preferences for use in downloading or streaming audio content to the user or any other suitable preferences or settings or configuration options for alarm clock radio 12.

Advertisements may be targeted to the user based on the user's preferences. Information on the user's preferences that is used in targeting advertisements may be gathered by monitoring the user's activities (e.g., by collecting information on the preferences the user adjusts at step 256, etc.) and reporting those activities to an appropriate service (e.g., a service located on a remote server on the Internet or the like). Information on the user's preferences may be gathered based on the preferences and settings that the user uses to set up operation of alarm clock radio 12 and that the user uses to customize the content that the user listens to. Targeted advertisements may be provided to alarm clock radio 12 at step 258 (e.g., in real time or downloaded as digital files and played back at a later time).

Although the features of alarm clock radio 12 have been described primarily in the context of alarm clock radios, the features of alarm clock radio 12 may be implemented using any suitable platform. For example, any of the functions of alarm clock radio 12 may be performed on an audio device such as a radio, stereo system, audio-visual component, personal computer, handheld computing device, in-home electronic device, web appliance, or other suitable electronic device.

The foregoing is merely illustrative of the principles of this invention and various modifications can be made by those skilled in the art without departing from the scope and spirit of the invention.

What is claimed is:

1. An audio device that handles internet music content that is provided to the audio device over an in-home network that is separate from the audio device and that handles audio that is provided to the audio device from an in-home computer, comprising:

control circuitry and memory;

short-range wireless communications circuitry that communicates with the in-home network over a short-range wireless communications link, wherein the control circuitry and memory are configured to use the short-range wireless communications circuitry to receive the internet music content and are configured to use the short-range wireless communications circuitry to receive the audio provided from the in-home computer;

a speaker coupled to the control circuitry and memory through which the control circuitry and memory plays the internet music content and the audio from the in-home computer to a user; and a user interface with which the user sets an alarm time for the audio device.

2. The audio device defined in claim 1 further comprising at least one control that allows the user to tune among internet radio stations.

3. The audio device defined in claim 1 wherein the audio comprises MP3 audio and wherein the control circuitry and memory are further configured to play the MP3 audio to the user with the speaker.

4. The audio device defined in claim 1 wherein MP3 audio is stored in the memory and wherein the control circuitry and memory are further configured to play the stored MP3 audio to the user with the speaker.

5. The audio device defined in claim 1 wherein the control circuitry and memory are further configured to receive subscription digital audio using the short-range wireless communications circuitry.

6. The audio device defined in claim 1 wherein the user interface is configured to provide the user with an option to direct the control circuitry and memory to play a prerecorded audio clip through the speaker for the user at the alarm time.

7. The audio device defined in claim 1 wherein the user interface comprises a display that displays menus and wherein the user interface comprises at least one button with which the user scrolls through the menus.

8. The audio device defined in claim 1 wherein the user interface comprises a display on which the control circuitry and memory display current time information.

9. The audio device defined in claim 8 wherein the user interface further comprises a button that the user presses to invoke a snooze function that postpones an alarm function after the alarm function has been triggered at the alarm time.

10. The audio device defined in claim 1 wherein the user interface further comprises a play button that is used by the user to control sound playback with the audio device.

11. The audio device defined in claim 1 wherein the user interface further comprises a play button that the user may press to initiate a playback function and a button that the user may press to stop playback.

12. The audio device defined in claim 1 wherein the user interface further comprises:

a first button that the user presses to initiate a playback function;

a second button that the user presses to stop playback; and a third button that the user presses to access a beginning portion of played back audio content.

13. The audio device defined in claim 12 wherein the user interface further comprises at least one volume control button.

14. The audio device defined in claim 1 wherein the user interface further comprises a button that is pressed by the user to initiate playback of a particular type of the internet music content.

15. The audio device defined in claim 1 wherein the internet music content comprises content associated with internet radio stations and wherein the user interface further comprises a display that displays information on a current internet radio station to which the audio device is tuned.

16. The audio device defined in claim 1 wherein the user interface comprises:

a display that displays information associated with the internet music content;

buttons that control playback functions including play, stop, and rewind; and a snooze button that postpones an alarm function after the alarm function is triggered at the alarm time.

* * * * *